US011988566B2

(12) United States Patent
Kadota et al.

(10) Patent No.: US 11,988,566 B2
(45) Date of Patent: May 21, 2024

(54) PULLING DETECTION DEVICE AND MOVING BODY SYSTEM COMPRISING SAME

(71) Applicant: Mitsubishi Electric Corporation, Tokyo (JP)

(72) Inventors: Naoya Kadota, Tokyo (JP); Kota Yano, Tokyo (JP); Yoshihiro Morimoto, Tokyo (JP); Daisuke Mizuno, Tokyo (JP); Yasuki Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 437 days.

(21) Appl. No.: 17/311,069

(22) PCT Filed: Dec. 13, 2018

(86) PCT No.: PCT/JP2018/045798
§ 371 (c)(1),
(2) Date: Jun. 4, 2021

(87) PCT Pub. No.: WO2020/121464
PCT Pub. Date: Jun. 18, 2020

(65) Prior Publication Data
US 2022/0042862 A1     Feb. 10, 2022

(51) Int. Cl.
*G01L 1/04*     (2006.01)
*G01L 5/101*    (2020.01)
*G01L 5/103*    (2020.01)

(52) U.S. Cl.
CPC .............. *G01L 1/042* (2013.01); *G01L 5/101* (2013.01); *G01L 5/103* (2013.01)

(58) Field of Classification Search
None
See application file for complete search history.

(56) References Cited

U.S. PATENT DOCUMENTS

| 5,371,488 A | * | 12/1994 | Couch | G08B 13/122 |
| | | | | 340/541 |
| 5,665,947 A | * | 9/1997 | Falcon | H01H 3/0226 |
| | | | | 200/61.18 |

(Continued)

FOREIGN PATENT DOCUMENTS

| JP | S5046179 U | 5/1975 |
| JP | S5692833 U | 7/1981 |

(Continued)

OTHER PUBLICATIONS

International Search Report (PCT/ISA/210) with translation and Written Opinion (PCT/ISA/237) mailed on Feb. 19, 2019, by the Japanese Patent Office as the International Searching Authority for International Application No. PCT/JP2018/045798. (11 pages).

*Primary Examiner* — Kristina M Deherrera
*Assistant Examiner* — Mark A Shabman
(74) *Attorney, Agent, or Firm* — BUCHANAN INGERSOLL & ROONEY PC

(57) ABSTRACT

A pulling detection device includes: a base in which, on a foundation portion, a first wall portion, a projection, and a second wall portion are provided; a movable rod including a switch operation body and a pulling rod, the switch operation body having a first wall portion opposed surface, a projection opposed surface, and a second wall portion opposed surface, the pulling rod extending from the second wall portion opposed surface, while movement of the movable rod toward one side is restricted by contact between the first wall portion and the first wall portion opposed surface and movement of the movable rod toward another side is restricted by contact between the projection and the projection opposed surface; an elastic body provided between the second wall portion opposed surface and the second wall (Continued)

portion; a first switch which operates by contact/separation; and a second switch which operates by contact/separation.

17 Claims, 24 Drawing Sheets

(56) References Cited

U.S. PATENT DOCUMENTS

| | | | | |
|---|---|---|---|---|
| 6,460,234 | B1* | 10/2002 | Gianchandani | G01L 9/0073 29/25.35 |
| 9,135,795 | B2* | 9/2015 | Ben-Hamozeg | E04H 17/127 |
| 9,442,032 | B2* | 9/2016 | Kuisma | G01L 9/0054 |
| 9,824,841 | B2* | 11/2017 | Tsang | G08B 21/187 |
| 10,315,013 | B2* | 6/2019 | Purdy | A61M 25/1011 |
| 2003/0173557 | A1 | 9/2003 | Tallman | |
| 2010/0050776 | A1* | 3/2010 | Fuhrmann | G01L 9/0073 73/718 |
| 2013/0238257 | A1* | 9/2013 | Rajamani | G01L 1/142 702/43 |
| 2017/0248481 | A1* | 8/2017 | Bubar | G01L 5/10 |
| 2018/0113040 | A1* | 4/2018 | Zheng | G01L 13/025 |
| 2018/0266904 | A1* | 9/2018 | D'Sa | G01L 5/047 |
| 2020/0273651 | A1* | 8/2020 | Tsang | H01H 71/50 |
| 2021/0261269 | A1* | 8/2021 | Thomas | B64C 9/22 |
| 2022/0042862 | A1* | 2/2022 | Kadota | G01L 5/101 |

FOREIGN PATENT DOCUMENTS

| | | |
|---|---|---|
| JP | S63125790 A | 5/1988 |
| JP | 2009012576 A | 1/2009 |
| JP | 2015224001 A | 12/2015 |

* cited by examiner

FIG. 4

| PATTERN | DEPRESSION STATE OF FIRST SWITCH | DEPRESSION STATE OF SECOND SWITCH | TENSION |
|---|---|---|---|
| A | ○ | × | SMALL |
| B | × | × | MIDDLE |
| C | × | ○ | GREAT |

FIG. 11

|  | | PULLING DETECTION PATTERN OF RIGHT DRIVE DEVICE | | |
|---|---|---|---|---|
|  |  | A | B | C |
| PULLING DETECTION PATTERN OF LEFT DRIVE DEVICE | A | A—A | A—B | A—C |
|  | B | B—A | B—B | B—C |
|  | C | C—A | C—B | C—C |

FIG. 15

| PATTERN | DEPRESSION STATE OF FIRST SWITCH | DEPRESSION STATE OF SECOND SWITCH | TENSION |
|---|---|---|---|
| A | ○ | ○ | SMALL |
| B | × | ○ | MIDDLE |
| C | ×(○) | × | GREAT |

FIG. 21

| PATTERN | DEPRESSION STATE OF SWITCH | | | | | |
|---|---|---|---|---|---|---|
| | 54a | 54b | ... | 54n | 44 | 45 |
| A | ○ | ○ | ... | ○ | ○ | × |
| B | × | ○ | ... | ○ | ○ | × |
| C | ×(○) | × | ... | ○ | ○ | × |
| ⋮ | ⋮ | ⋮ | ⋮ | ⋮ | ⋮ | ⋮ |
| n | ×(○) | ×(○) | ... | ○ | ○ | × |
| n+1 | ×(○) | ×(○) | ... | × | ○ | × |
| n+2 | ×(○) | ×(○) | ... | ×(○) | × | × |
| n+3 | ×(○) | ×(○) | ... | ×(○) | × | ○ |

PULLING DETECTION DEVICE AND MOVING BODY SYSTEM COMPRISING SAME

TECHNICAL FIELD

The present disclosure relates to a pulling detection device and a moving body system including the same.

BACKGROUND ART

There is a case where a moving body such as an examination robot travels, for example, inside an apparatus or equipment, to perform an examination. Conventionally, a moving body system using such a moving body includes a moving body, a control unit, and a control cable connecting these. In such a system with wired connection, when, for example, the control cable pulled by the moving body traveling is caught on an obstacle, excessive tension arises, thus causing a problem that the control cable is damaged or broken. In addition, there is a problem that movement of the moving body is hampered by excessive tension or in the worst case, the moving body drops from the traveling surface.

In order to solve the above problems, disclosed is a method in which a wire shorter than an external cable connected between moving elements is provided along the external cable, and when the wire is pulled with excessive tension exceeding a certain level, a contact of a switch connected to the wire is opened, to detect the excessive tension (see, for example, Patent Document 1).

CITATION LIST

Patent Document

Patent Document 1: Japanese Laid-Open Patent Publication No. 63-125790

SUMMARY OF THE INVENTION

Problems to be Solved by the Invention

In Patent Document 1, excessive tension acting on the external cable can be detected with a simple structure, but there is a problem that only a specific magnitude of tension can be detected and it is impossible to detect tensions with different magnitudes in stages. In addition, since staged detection for the tension is impossible, there is a problem that it is impossible to take a wide range of control options such as taking an action of avoiding hampering of movement of the moving body or performing an operation of stopping the movement, in stages, in accordance with the magnitude of the tension.

One improvement example for Patent Document 1 is a method of directly measuring a pulling amount or tension by using a displacement sensor, a proximity sensor, a load cell, or the like in order to detect the tension of the external cable in stages. However, there is a problem that a device for measuring the pulling amount or the tension and amplifying and outputting a signal according to the measured value is often increased in size. In addition, in order to prevent hampering of movement of the moving body, it is necessary to detect tension acting between the moving body and the external cable, and therefore there is a problem that it is difficult to provide such a large-sized device at a location where the moving body and the external cable are connected. In addition, even if, for the purpose of reducing the device size, a device for amplifying the signal is not provided at the above location, there is a problem that the wiring to the control unit needs to be provided with some measures against environmental noise.

The present disclosure has been made to solve the above problems, and an object of the present disclosure is to obtain a pulling detection device capable of detecting tension acting on a moving body from a control cable, in stages and highly reliably, with a small-sized and simple structure, and a moving body system including the pulling detection device.

Solution to the Problems

A pulling detection device according to the present disclosure includes: a base in which, on a plate-shaped foundation portion extending in a longitudinal direction, a first wall portion, a projection opposed to the first wall portion, and a second wall portion opposed to the projection are provided in this order in the longitudinal direction; a movable rod including a switch operation body and a pulling rod, the switch operation body having a first wall portion opposed surface opposed to the first wall portion, a projection opposed surface opposed to a side of the projection opposed to the first wall portion, and a second wall portion opposed surface opposed to the second wall portion, the pulling rod extending from the second wall portion opposed surface so as to penetrate the second wall portion, the movable rod being movable along the foundation portion in the longitudinal direction of the foundation portion, while movement of the movable rod toward one side in the longitudinal direction is restricted by contact between the first wall portion and the first wall portion opposed surface and movement of the movable rod toward another side in the longitudinal direction is restricted by contact between the projection and the projection opposed surface; an elastic body provided between the second wall portion opposed surface and the second wall portion so as to press the second wall portion opposed surface, the elastic body being extendable/contractible in the longitudinal direction of the foundation portion; a first switch which operates by contact/separation between the first wall portion and the first wall portion opposed surface; and a second switch which operates by contact/separation between the projection and the projection opposed surface.

Effect of the Invention

The pulling detection device according to the present disclosure can detect tension acting on a moving body from a control cable, in stages and highly reliably, with a small-sized and simple structure.

BRIEF DESCRIPTION OF THE DRAWINGS

FIG. 4 shows detection patterns of the pulling detection device according to embodiment 1.

FIG. 11 shows detection patterns of the moving body system according to embodiment 2.

FIG. 15 shows detection patterns of the pulling detection device according to embodiment 3.

FIG. 21 shows detection patterns of the pulling detection device according to embodiment 4.

DESCRIPTION OF EMBODIMENTS

Figure 1:
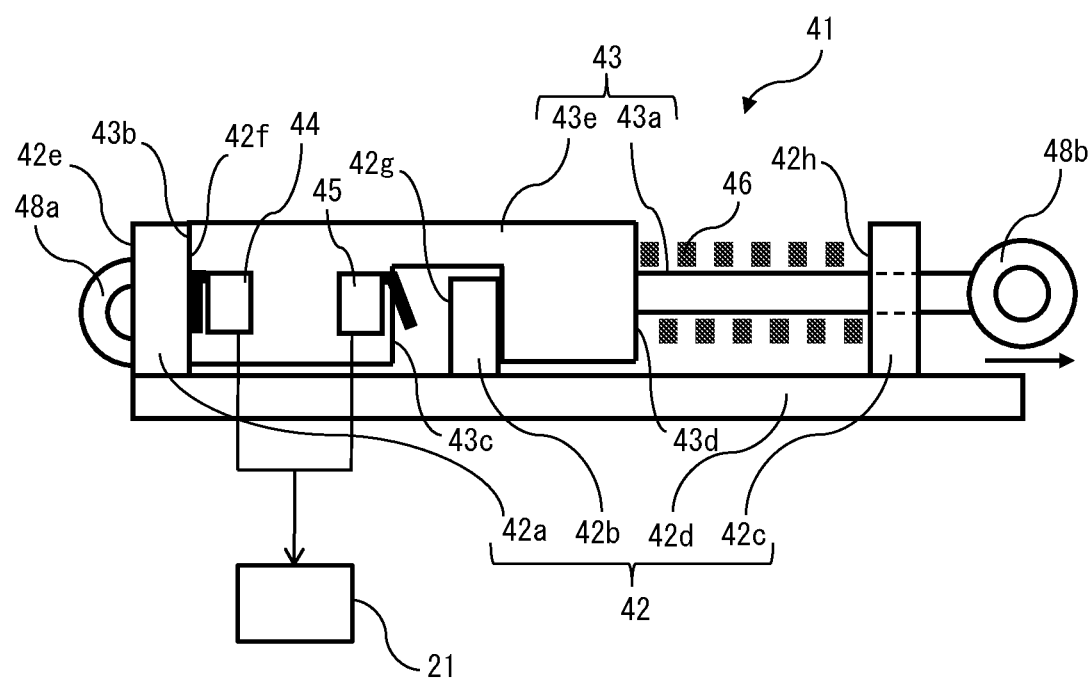
FIG. 1 is a schematic view showing an overall structure of a pulling detection device according to embodiment 1.

Hereinafter, a pulling detection device and a moving body system including the same, according to embodiments of the present disclosure, will be described with reference to the drawings. In the drawings, the same or corresponding members or parts are denoted by the same reference characters, to give description.

Embodiment 1

Figure 2:
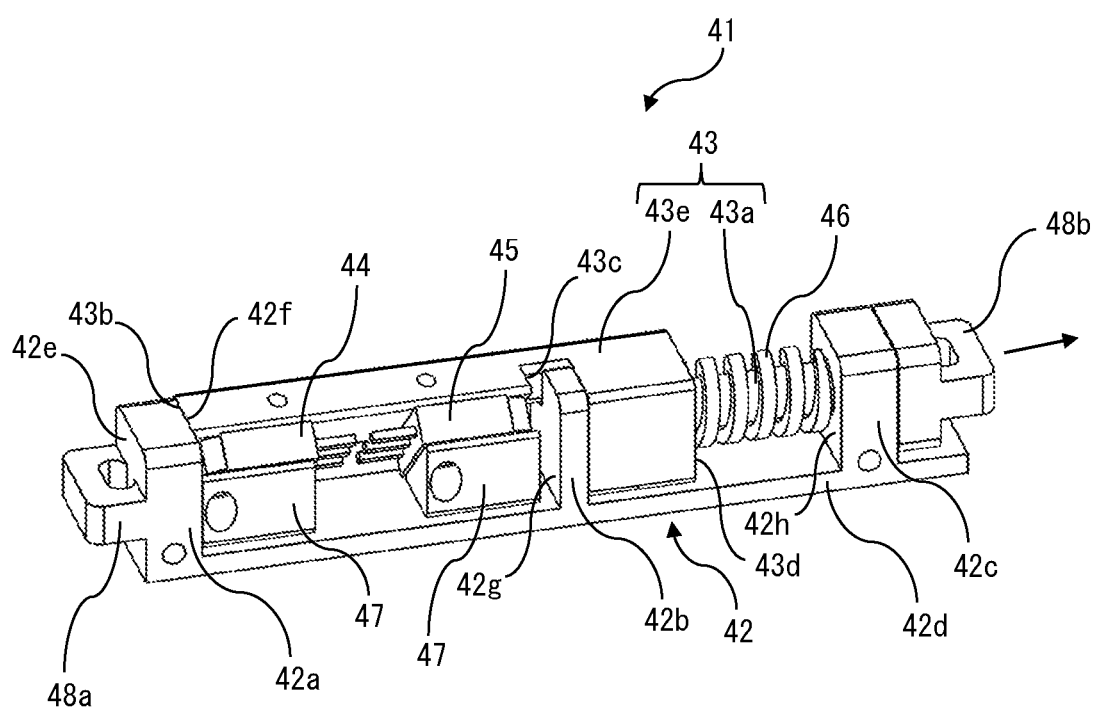
FIG. 2 is a perspective view showing an overall structure of the pulling detection device according to embodiment 1.

FIG. 1 is a schematic view showing an overall structure of a pulling detection device 41 according to embodiment 1, and FIG. 2 is a perspective view showing an overall structure of the pulling detection device 41. The pulling detection device 41 detects, in stages, the magnitude of tension acting between a pulling portion 48a and a pulling portion 48b provided at both ends. As shown in FIG. 2, the pulling detection device 41 includes a base 42, a movable rod 43, a first switch 44 and a second switch 45 which are depressed and operated, a compression spring 46, and guides 47. In FIG. 2, an outer cover is removed so that the inside of the pulling detection device 41 is shown, and the outer cover (not shown) is fixed to the base 42 by screwing or the like.

The base 42 is formed such that a first wall portion 42a, a projection 42b opposed to the first wall portion 42a, and a second wall portion 42c opposed to the projection 42b are provided in this order in the longitudinal direction on a plate-shaped foundation portion 42d extending in the longitudinal direction. The pulling portion 48a is provided at an outer side surface 42e which is a side surface opposite to an inner side surface 42f which is a side surface of the first wall portion 42a opposed to a first wall portion opposed surface 43b. At the pulling portion 48a formed in a hollow ring shape, for example, a moving body is connected as described later.

The movable rod 43 includes: a switch operation body 43e having the first wall portion opposed surface 43b opposed to the inner side surface 42f of the first wall portion 42a, a projection opposed surface 43c opposed to a side of the projection 42b opposed to the first wall portion 42a, and a second wall portion opposed surface 43d opposed to an inner side surface 42h of the second wall portion 42c; and a pulling rod 43a extending from the second wall portion opposed surface 43d so as to penetrate the second wall portion 42c. The pulling portion 48b is provided at an end of the pulling rod 43a protruding from the second wall portion 42c. The switch operation body 43e and the pulling rod 43a are connected by a screw, welding, or the like. At the pulling portion 48b formed in a hollow ring shape, for example, a control cable is connected as described later. The movable rod 43 is supported by the guides 47 provided on the foundation portion 42d, and is movable along the foundation portion 42d in the longitudinal direction of the foundation portion 42d. By contact between the first wall portion 42a and the first wall portion opposed surface 43b, movement of the movable rod 43 toward one side in the longitudinal direction is restricted, and by contact between the projection 42b and the projection opposed surface 43c, movement of the movable rod 43 toward another side in the longitudinal direction is restricted. The movement is restricted in one direction (arrow direction in FIG. 1) by the guides 47 and the second wall portion 42c. In FIG. 2, the guides 47 support the movable rod 43 via the first switch 44 and the second switch 45, but without limitation thereto, the movable rod 43 may be directly supported.

As shown in FIG. 1, the first switch 44 and the second switch 45 are provided to the switch operation body 43e. The first switch 44 and the second switch 45 are depression-type switches each of which operates by depression of a lever portion provided to the switch from an opened state when a load is applied. In a state in which the first wall portion opposed surface 43b is pressed to the inner side surface 42f of the first wall portion 42a, the first switch 44 is depressed. In a state in which the projection opposed surface 43c is pressed to one side 42g of the projection 42b, the second switch 45 is depressed. When the first switch 44 or the second switch 45 is operated by being opened from a depressed state or being depressed from an opened state, the operation is transmitted to a control unit 21 provided outside the pulling detection device 41. The transmission of the operation may be performed via a wire or wirelessly.

As shown in FIG. 1, the compression spring 46 which is an elastic body is provided between the second wall portion opposed surface 43d and the inner side surface 42h of the second wall portion 42c so that the compression spring 46 extends/contracts in the longitudinal direction of the foundation portion 42d and presses the second wall portion opposed surface 43d so as to cause the first wall portion opposed surface 43b to be pressed to the first wall portion 42a. The magnitude of the preload of the compression spring 46 by the above pressing is set to a value obtained by adding a return force of the first switch 44 to return to an opened state, to the magnitude of the tension in the first stage to be detected. When the pulling portion 48b of the pulling rod 43a is pulled by a predetermined distance in a movable direction of the movable rod 43 in which the compression spring 46 contracts, the second switch 45 comes into contact with the one side 42g of the projection 42b and thus is depressed. The above distance is set to a value obtained by subtracting the preload of the compression spring 46 from the magnitude of the tension in the second stage to be detected and then dividing the subtraction result by the spring constant of the compression spring 46.

The first switch 44, the second switch 45, the first wall portion 42a, the projection 42b, and the pulling rod 43a are arranged in a straight line in the direction in which the tension acts. Such an arrangement can reduce the size in the direction perpendicular to the direction in which the tension acts, so that the pulling detection device 41 is downsized.

Next, pulling detection operation of the pulling detection device 41 will be described. When the pulling portion 48a and the pulling portion 48b are pulled, tension acts between the pulling portion 48a and the pulling portion 48b. FIG. 3A to FIG. 3D are schematic views showing operations of the pulling detection device 41 according to embodiment 1. In a condition in which no tension acts (FIG. 3A), the first wall portion opposed surface 43b of the movable rod 43 is pressed to the inner side surface 42f of the first wall portion 42a by the preload of the compression spring 46. Meanwhile, the one side 42g of the projection 42b and the projection opposed surface 43c of the movable rod 43 are separated from each other. Thus, the first switch 44 is depressed and the second switch 45 is opened.

In a condition in which smaller tension (small arrow) than the preload imparted to the compression spring 46 acts (FIG. 3B), the preload of the compression spring 46 is greater than the magnitude of the tension, and therefore, as in the condition in which no tension acts (FIG. 3A), the first switch 44 is depressed and the second switch 45 is opened.

Figure 3A:
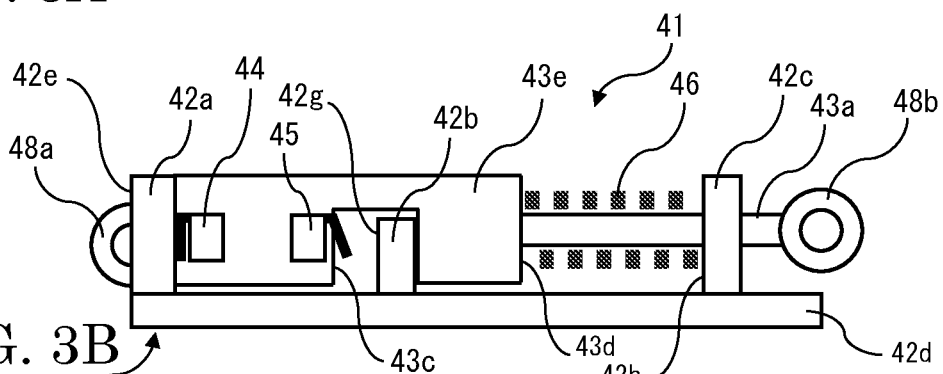
FIG. 3A is a schematic view showing operation of the pulling detection device according to embodiment 1.
Figure 3B:
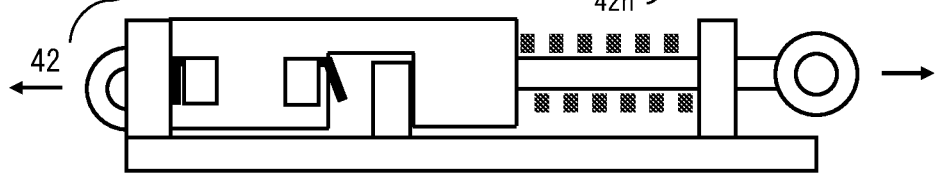
FIG. 3B is a schematic view showing operation of the pulling detection device according to embodiment 1.
Figure 3C:
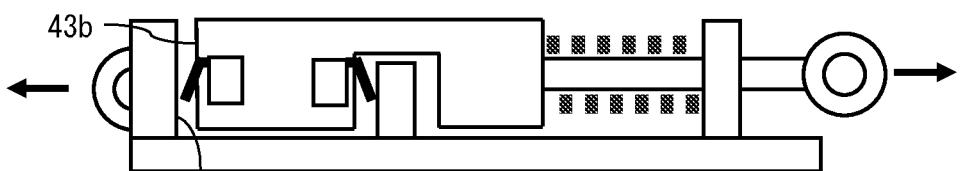
FIG. 3C is a schematic view showing operation of the pulling detection device according to embodiment 1.
Figure 3D:
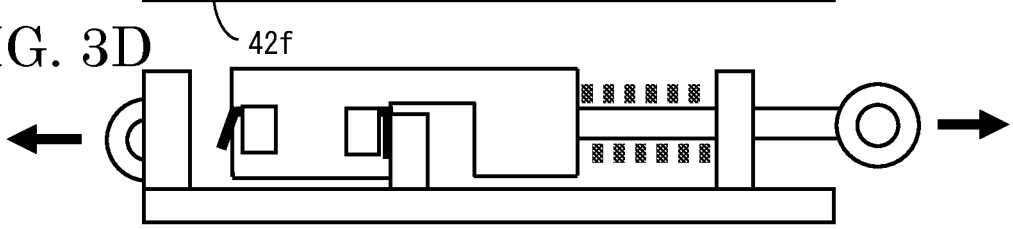
FIG. 3D is a schematic view showing operation of the pulling detection device according to embodiment 1.

In a condition in which tension (middle arrow) greater than the magnitude of the tension in the first stage to be detected and smaller than the magnitude of the tension in the second stage to be detected, acts (FIG. 3C), a force greater than the preload of the compression spring 46 acts, so that the compression spring 46 is compressed and the movable rod 43 is displaced rightward in FIG. 3C. Along with the displacement, the first switch 44 is opened, so that the tension in the first stage to be detected is detected. FIG. 3C shows a state after the first switch 44 is opened, and it is found that greater tension than the tension in the first stage to be detected is acting. It is noted that the second switch 45 has not been depressed yet.

In a condition in which further great tension (large arrow) acts (FIG. 3D), the compression spring 46 is greatly compressed. As a result of displacement of the movable rod 43 by this compression, the one side 42g of the projection 42b and the projection opposed surface 43c of the movable rod 43 come into contact with each other, so that the second switch 45 is depressed. At this time, the tension in the second stage to be detected is detected. It is noted that displacement of the movable rod 43 is constrained by the contact between the projection opposed surface 43c of the movable rod 43 and the projection 42b.

FIG. 4 shows detection patterns of the pulling detection device 41 according to embodiment 1. In FIG. 4, ○ indicates a depressed state of the switch, and x indicates an opened state of the switch. As shown in FIG. 4, the pulling detection device 41 can detect three patterns A, B, C. The pattern A is a state in which the first switch 44 is depressed and the second switch 45 is opened, the pattern B is a state in which the first switch 44 and the second switch 45 are both opened, and the pattern C is a state in which the first switch 44 is opened and the second switch 45 is depressed. The magnitudes of the tension in the three patterns respectively correspond to a small level, a middle level, and a great level. For example, in the case where the pulling detection device 41 is connected to a moving body, the three patterns are respectively determined as a normal state, a warning state, and a dangerous state, and control for movement of the moving body can be changed in accordance with the above determination.

Figure 5:
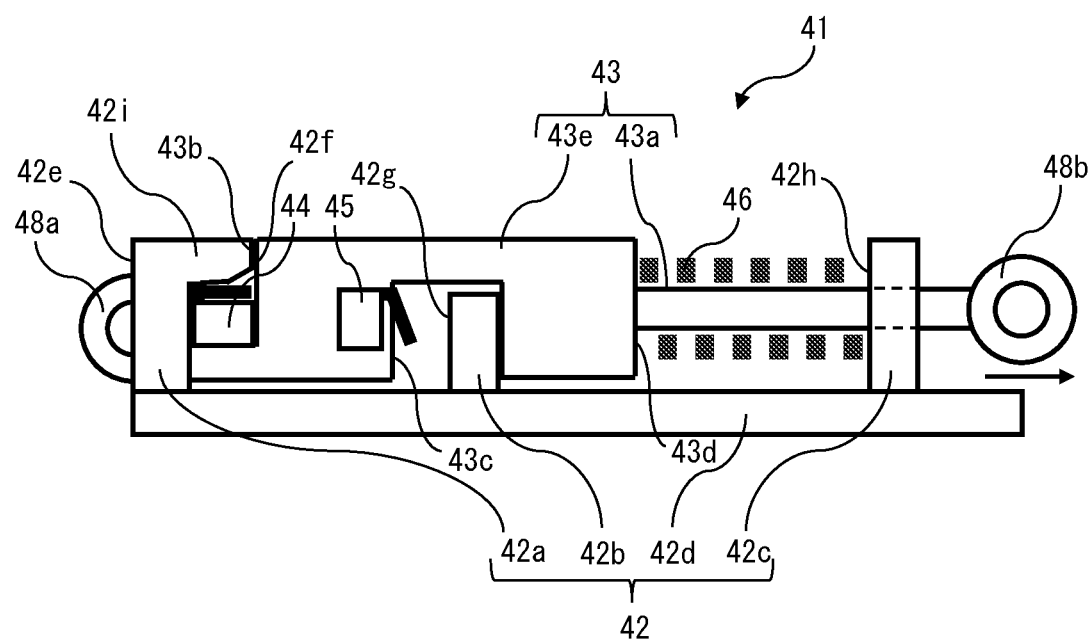
FIG. 5 is a schematic view showing an overall structure of another pulling detection device according to embodiment 1.

In the above description, the first switch 44 and the second switch 45 are switches that operate in the same direction as the pulling direction. However, without limitation thereto, for example, as shown in FIG. 5, a switch that operates in a direction perpendicular to the pulling direction may be used. A stepped portion 42i for the first switch 44 to operate is provided to the base 42, whereby the same function is realized. In the above description, the first switch 44 and the second switch 45 are provided to the movable rod 43. However, without limitation thereto, switches may be provided to the first wall portion 42a to which the first switch 44 is opposed, and the projection 42b to which the second switch 45 is opposed.

As described above, in the pulling detection device according to embodiment 1, the compression spring 46 is provided between the movable rod 43 and the base 42, and the magnitude of tension acting on the pulling detection device 41 can be detected in stages using combinations of depressed and opened operation states of the first switch 44 and the second switch 45 provided to the movable rod 43, whereby it is possible to detect the magnitude of tension in stages and highly reliably with a small-sized and simple structure. In addition, the first switch 44, the second switch 45, the first wall portion 42a, the projection 42b, and the pulling rod 43a are arranged in a straight line in the direction in which the tension acts, whereby the size in the direction perpendicular to the direction in which the tension acts can be reduced and thus the pulling detection device 41 can be downsized. In addition, since general depression-type switches can be used for the first switch 44 and the second switch 45, the pulling detection device 41 can be simply configured. In addition, since the first switch 44 and the second switch 45 are provided to the movable rod 43 along the movable direction thereof, the pulling detection device 41 can be downsized without hampering movement of the movable rod 43.

Embodiment 2

Figure 6:
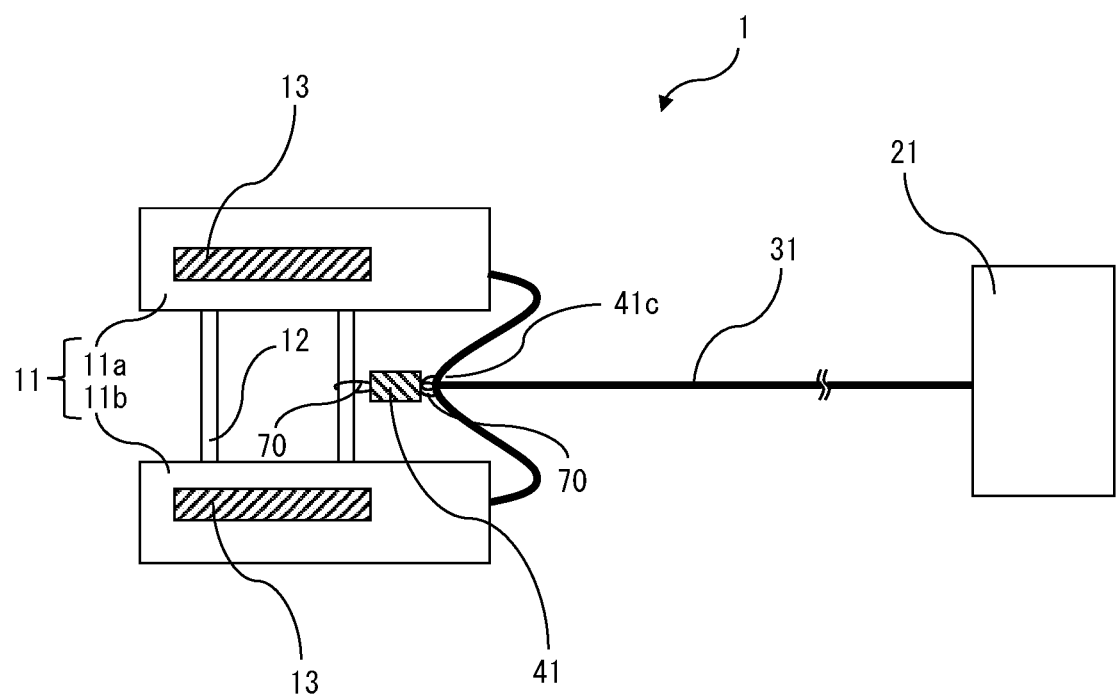
FIG. 6 is a schematic view showing an overall structure of a moving body system according to embodiment 2.

In embodiment 2, a configuration in which the pulling detection device 41 described in embodiment 1 is used in a moving body system 1 will be described. FIG. 6 is a schematic view showing an overall structure of the moving body system 1 according to embodiment 2. The moving body system 1 includes a moving body 11, a control unit 21, and a control cable 31, and the pulling detection device 41 described in embodiment 1. The moving body 11 has a first moving body 11a and a second moving body 11b connected via connection members 12, and moves by using traveling devices 13 respectively provided to the first moving body 11a and the second moving body 11b. The moving body 11 is an examination robot for performing a layer short-circuit examination and a wedge tapping examination in a large-sized electric generator, for example. The control unit 21 controls movement of the moving body 11. The control cable 31 connects the moving body 11 and the control unit 21, and supplies a control signal and power to the moving body 11.

The pulling detection device 41 detects the magnitude of tension acting on the moving body 11 from the control cable 31, in stages. At the pulling portion 48a and the pulling portion 48b provided at both ends as shown in FIG. 1, the pulling detection device 41 is connected to the moving body 11 and the control cable 31 via wires 70 which do not easily extend/contract. The control cable 31, and the first moving body 11a and the second moving body 11b, are connected such that the control cable 31 from a connection portion 41c connected with the pulling detection device 41 to the first moving body 11a and the second moving body 11b is always in a loose state. Therefore, tension acting on the control cable 31 acts on the moving body 11 always via the pulling detection device 41. The connection between the pulling detection device 41, and the moving body 11 and the control cable 31, is not limited to connection via the wires 70, but they may be directly connected.

Figure 7A:
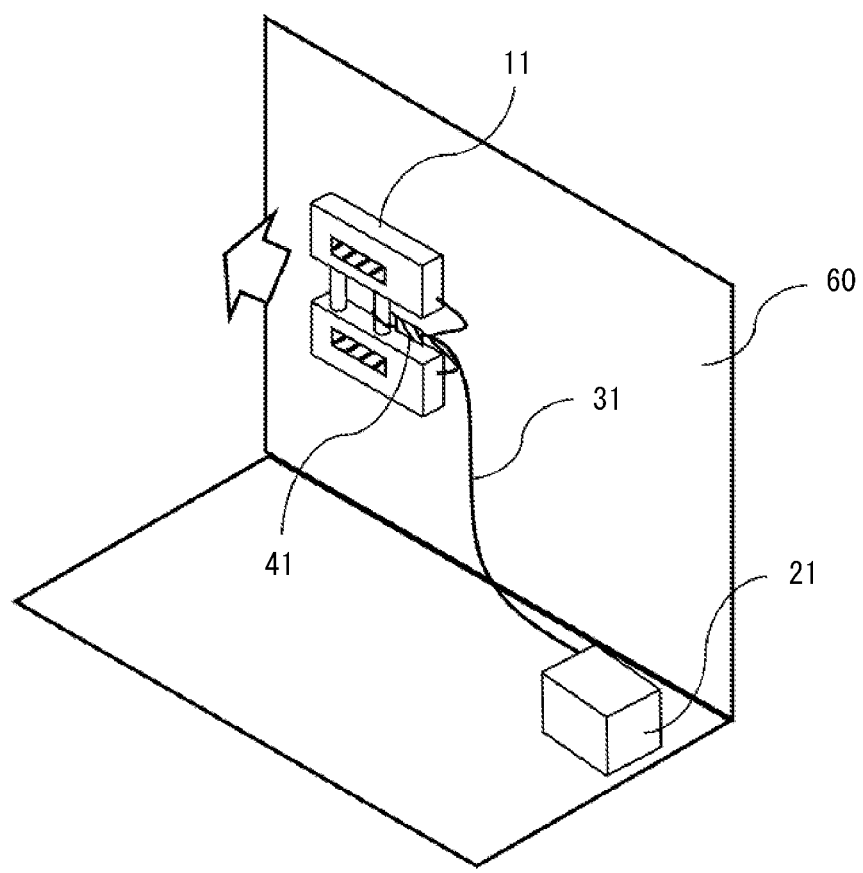
FIG. 7A shows an example of operation of the moving body system according to embodiment 2.
Figure 7B:
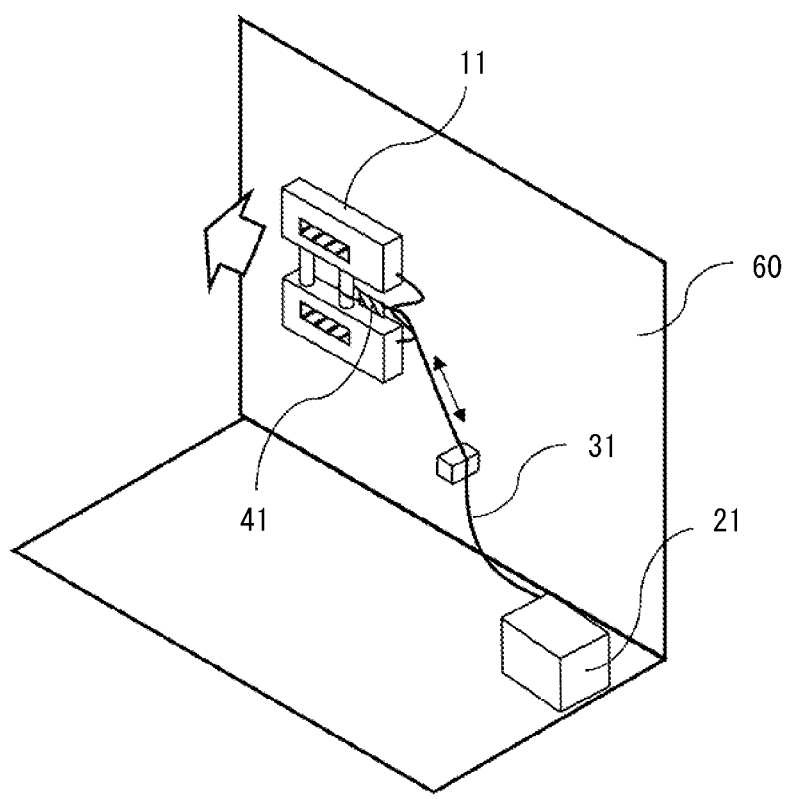
FIG. 7B shows another example of operation of the moving body system according to embodiment 2.
Figure 7C:
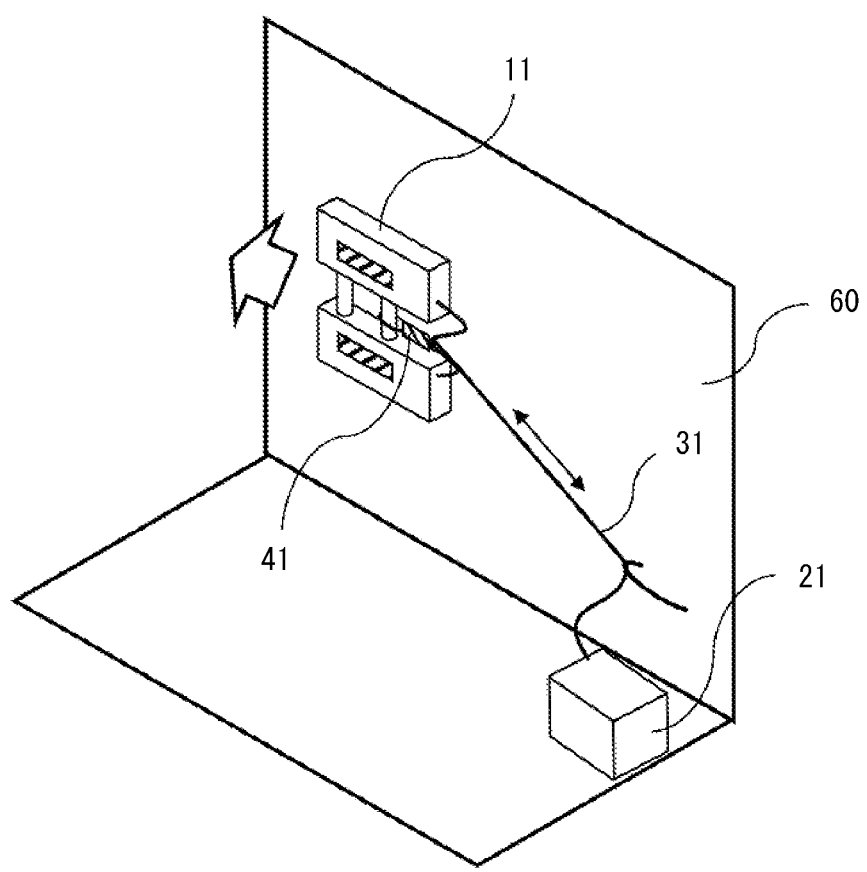
FIG. 7C shows still another example of operation of the moving body system according to embodiment 2.

FIG. 7A to FIG. 7C show examples of operations of the moving body system 1 according to embodiment 2. In these drawings, the moving body 11 moves while being on a wall surface 60, and tension greater than the weight of the control cable 31 is set as the magnitude of the tension to be detected in the first stage. FIG. 7A shows a normal operation of the moving body 11, the control cable 31 sags along the wall surface 60 by the own weight, and the moving body 11 supports the control cable 31. At this time, tension smaller than the preload of the compression spring 46 acts on the pulling detection device 41, and therefore the pulling detection device 41 is in the state of the pattern A in FIG. 4 and is determined to be in the normal state.

FIG. 7B shows a situation in which the control cable 31 is caught on a protrusion or the like. In this situation, as the moving body 11 continues advancing forward, the control cable 31 is gradually pulled and the magnitude of the tension also gradually increases. When the magnitude of the tension to be detected in the first stage is exceeded in the pulling detection device 41, the pulling detection device 41 comes into the state of the pattern B in FIG. 4 and is determined to be in the warning state. Thus, it can be considered that some abnormality has occurred in the control cable 31.

FIG. 7C shows a situation in which the control cable 31 is pulled due to an external factor. In this situation, the tension acting on the control cable 31 instantaneously increases. When the magnitude of the tension to be detected in the second stage is exceeded in the pulling detection device 41, the pulling detection device 41 comes into the state of the pattern C in FIG. 4 and is determined to be in the dangerous state. In this determination, for example, if operation of the moving body 11 is emergently stopped and self-restoration is prohibited, the external factor can be eliminated and then operation of the moving body 11 can be restarted.

Figure 8:
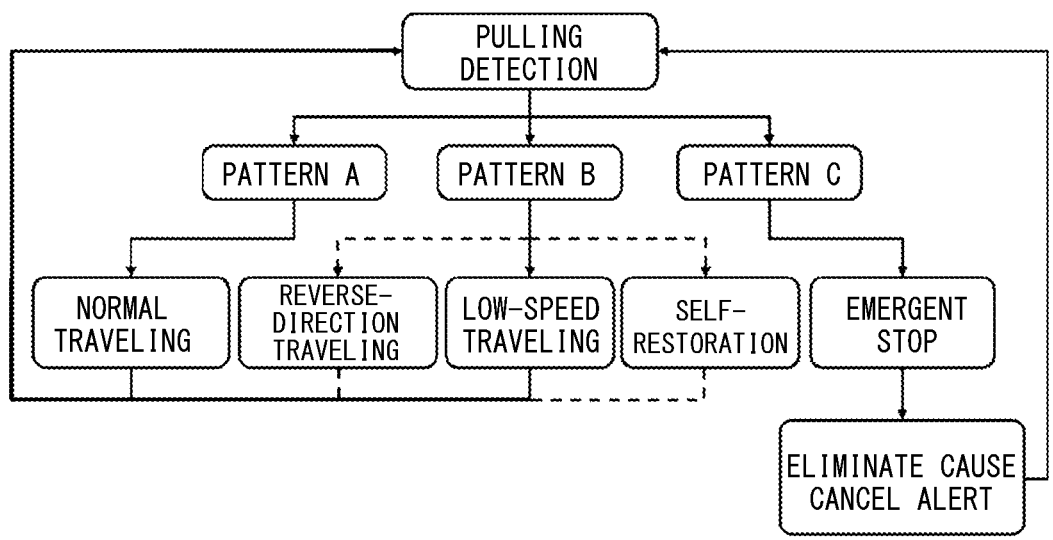
FIG. 8 shows an example of control of the moving body system according to embodiment 2.

FIG. 8 shows an example of control of the moving body system 1 according to embodiment 2. The three detection patterns shown in FIG. 4 are respectively defined as the normal state, the warning state, and the dangerous state, to control movement of the moving body 11. While the normal state of the pattern A is detected, normal traveling is kept being performed. When the warning state of the pattern B is detected, the mode is changed to a mode of traveling so as to avoid the warning state or traveling while paying attention thereto. For example, in such an environment that the tension of the control cable 31 inevitably increases under a specific condition, the traveling speed is reduced so that traveling can be ensured as stably as possible. Alternatively, if an operation of traveling in a reverse direction so as to return the position of the moving body 11 is instructed, for example, the caught state of the control cable 31 may be naturally eliminated and thus self-restoration can be achieved. When the dangerous state of the pattern C is detected, the moving body system 1 emergently stops operation of the moving body 11 and outputs an alert to an operator, a manager, or the like. The operator, the manager, or the like manually eliminates the cause for the excessive tension and cancels the alert, thus returning to the original control loop.

The magnitudes of the tension in the first stage and the second stage to be detected may be arbitrarily selected in accordance with the intended usage. For example, the magnitude of tension corresponding to a traveling torque limit of the moving body 11 may be set, a value obtained by multiplying a condition that the moving body 11 falls or drops by a safety factor may be set, or a value obtained by multiplying the strength of the control cable 31 by a safety factor may be set.

In the above description, the pulling portion 48a and the moving body 11 are connected and the pulling portion 48b and the control cable 31 are connected. However, without limitation thereto, the pulling portion 48a and the control cable 31 may be connected and the pulling portion 48b and the moving body 11 may be connected.

Figure 9:
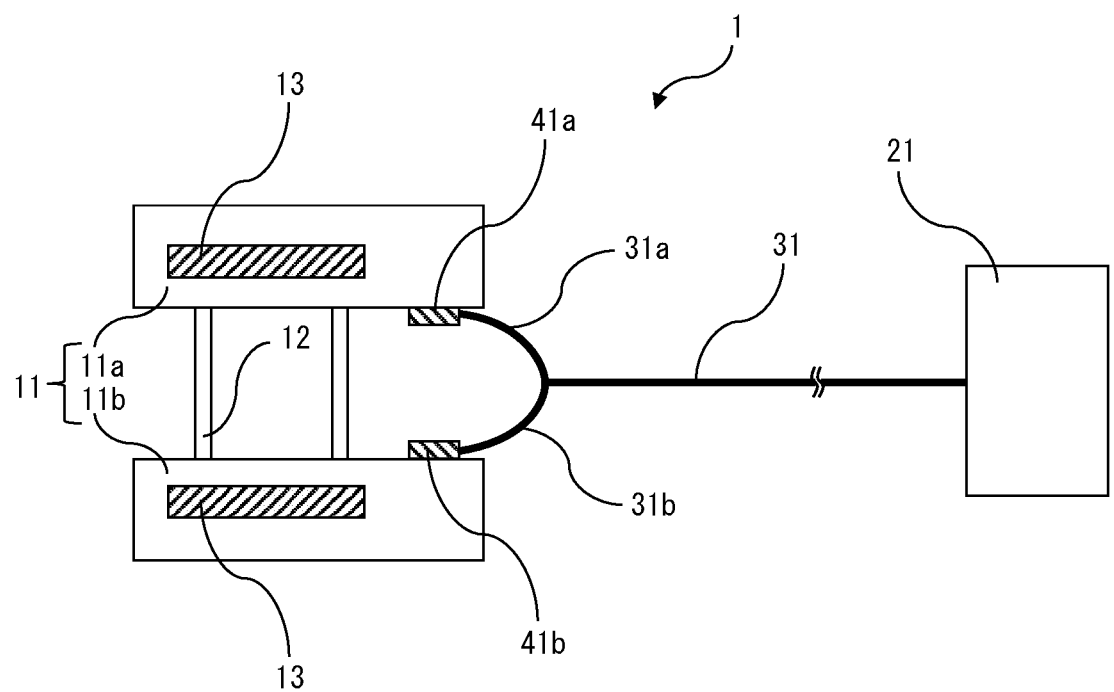
FIG. 9 is a schematic view showing an overall structure of another moving body system according to embodiment 2.
Figure 10:
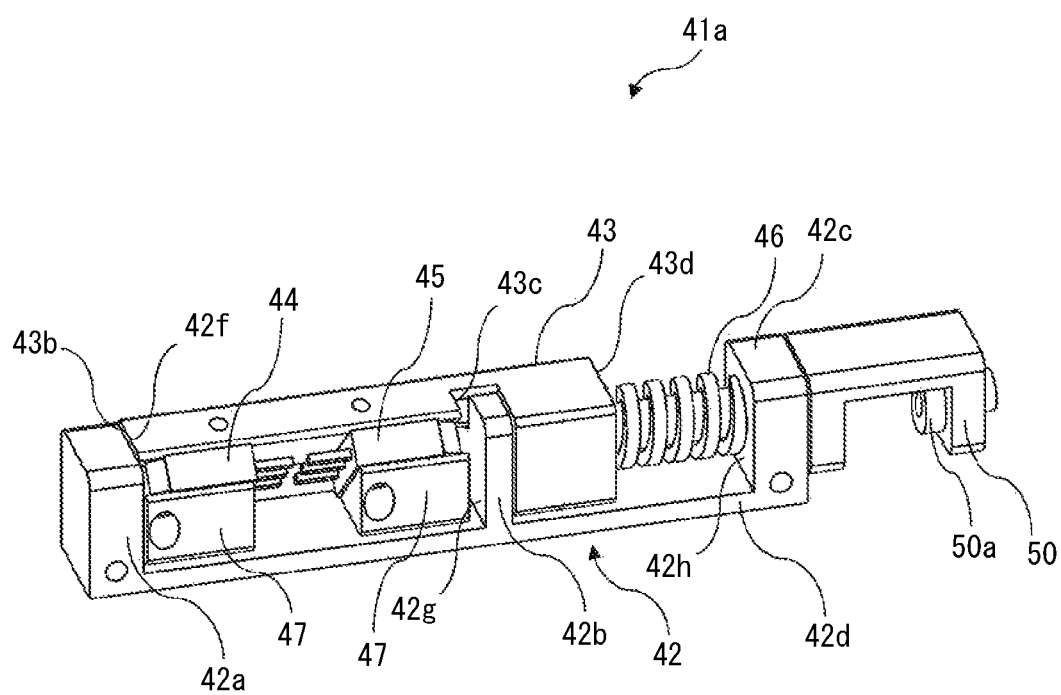
FIG. 10 is a perspective view showing an overall structure of a pulling detection device according to embodiment 2.

Next, another moving body system 1 according to embodiment 2 will be described with reference to FIG. 9 to FIG. 11. FIG. 9 is a schematic view showing an overall structure of the moving body system, and FIG. 10 is a perspective view showing an overall structure of the pulling detection device. In the other moving body system 1, the pulling detection devices are respectively provided to the first moving body 11a and the second moving body 11b composing the moving body 11.

As shown in FIG. 9, the moving body system 1 includes the moving body 11, the control unit 21, the control cable 31, and a pulling detection device 41a and a pulling detection device 41b respectively provided to the first moving body 11a and the second moving body 11b. The control cable 31 is branched into a control cable 31a and a control cable 31b. The control cable 31a is connected to the first moving body 11a via the pulling detection device 41a, and the control cable 31b is connected to the second moving body 11b via the pulling detection device 41b. The pulling detection device 41a detects the magnitude of tension acting on the first moving body 11a from the control cable 31a, in stages, and the pulling detection device 41b detects the magnitude of tension acting on the second moving body 11b from the control cable 31b, in stages.

The pulling detection device 41a and the pulling detection device 41b have the same configuration, and therefore the pulling detection device 41a will be described. As shown in FIG. 10, the pulling detection device 41a includes the base 42, the movable rod 43, the first switch 44 and the second switch 45 which are depressed and operated, the compression spring 46, the guides 47, a cable guide 50, and an outer cover (not shown) covering these.

The movable rod 43 is configured such that the cable guide 50 is provided to an end of the pulling rod 43a extending from the second wall portion opposed surface 43d through the second wall portion 42c. For example, the cable guide 50 and the control cable 31a are connected at a through hole 50a formed in the cable guide 50. The tension acting on the control cable 31a is transmitted to the movable rod 43 via the cable guide 50. The structure for fixing the cable guide 50 and the control cable 31a is not limited to the connection using the through hole 50a. Another fixation method such as fixation using a cable connector may be employed.

The pulling detection device 41a and the pulling detection device 41b are provided at positions where the control cable 31 is led out from the moving body 11. Therefore, the magnitude of tension acting on the moving body 11 from the control cable 31 can be accurately detected. In addition, since the magnitude of tension acting on each of the first moving body 11a and the second moving body 11b can be detected, a branch can be added to the control conditions. FIG. 11 shows detection patterns of the moving body system 1. Three patterns A, B, C are the same as the patterns shown in FIG. 4. As shown in FIG. 11, detection patterns of the pulling detection device 41a and the pulling detection device 41b are combined, whereby nine types of patterns are detected. Regarding the control for each pattern, for example, in the case where the detection states of the pulling detection device 41a and the pulling detection device 41b are the same, the same control as the control shown in FIG. 8 may be performed, and in the case where the detection states of both devices are different, a restoration operation may be performed while performing a turning operation so as not to further apply a load to the device on which the magnitude of the tension is greater.

In the above description, the moving body 11 includes the first moving body 11a and the second moving body 11b and the pulling detection devices 41 are provided respectively. However, without limitation thereto, the moving body 11 may include more moving bodies, and the pulling detection devices 41 may be provided respectively.

As described above, in the moving body system 1 according to embodiment 2, since the magnitude of tension acting on the control cable 31 can be detected by the pulling detection device 41 in stages and highly reliably, it is possible to execute an action of avoiding hampering of movement of the moving body 11 or an operation of stopping movement of the moving body 11 in accordance with the stage of the magnitude of the tension, whereby damage or breakage of the control cable 31 can be inhibited highly reliably. In addition, in the other moving body system 1, since the control cable is connected to the pulling detection device fixed to the moving body 11, the magnitude of tension acting on the moving body 11 from the control cable 31 can be accurately detected. In addition, since the pulling detection devices 41 are respectively provided to the first moving body 11a and the second moving body 11b and the magnitude of each of the tensions acting thereon can be detected, a branch can be added to the control conditions, whereby it is possible to finely execute an action of avoiding hampering of movement of the moving body 11 or an operation of stopping movement of the moving body 11.

The pulling detection device 41 is also applicable to another system under a specific tension environment. For example, while the detection states in FIG. 4 are regarded as an excessively small tension state, an appropriate tension state, and an excessively great tension state, movement stroke of the movable rod 43 or the spring constant of the compression spring 46 may be set in accordance with each state, whereby the pulling detection device 41 can be utilized as an appropriate tension management device.

Embodiment 3

Figure 12:
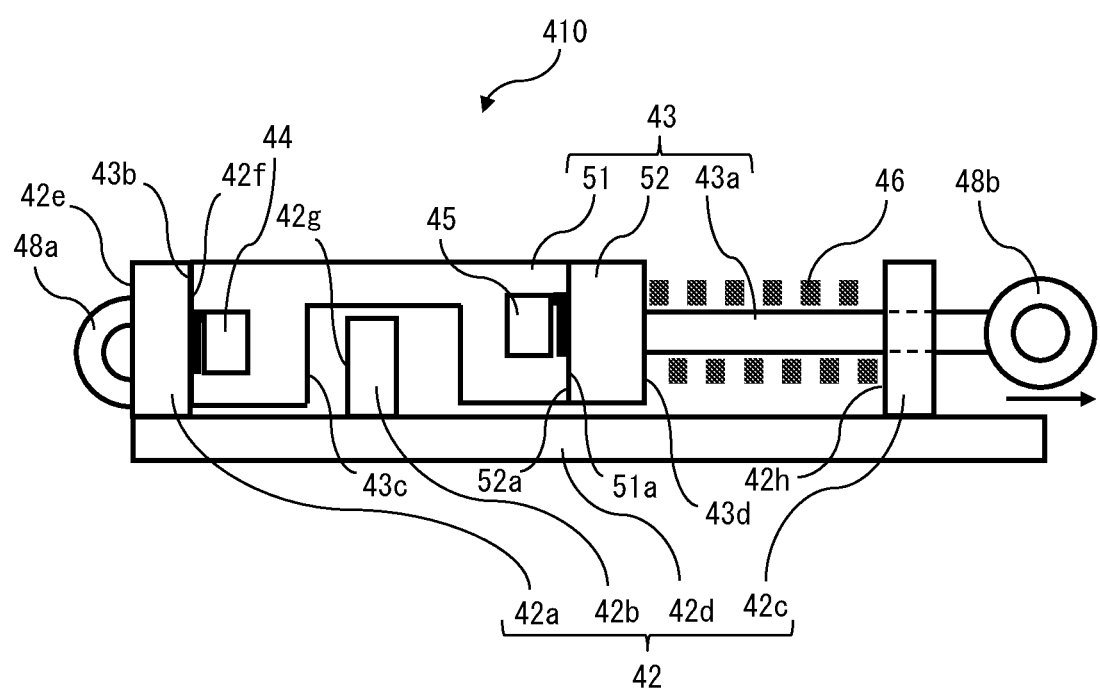
FIG. 12 is a schematic view showing an overall structure of a pulling detection device according to embodiment 3.
Figure 13:
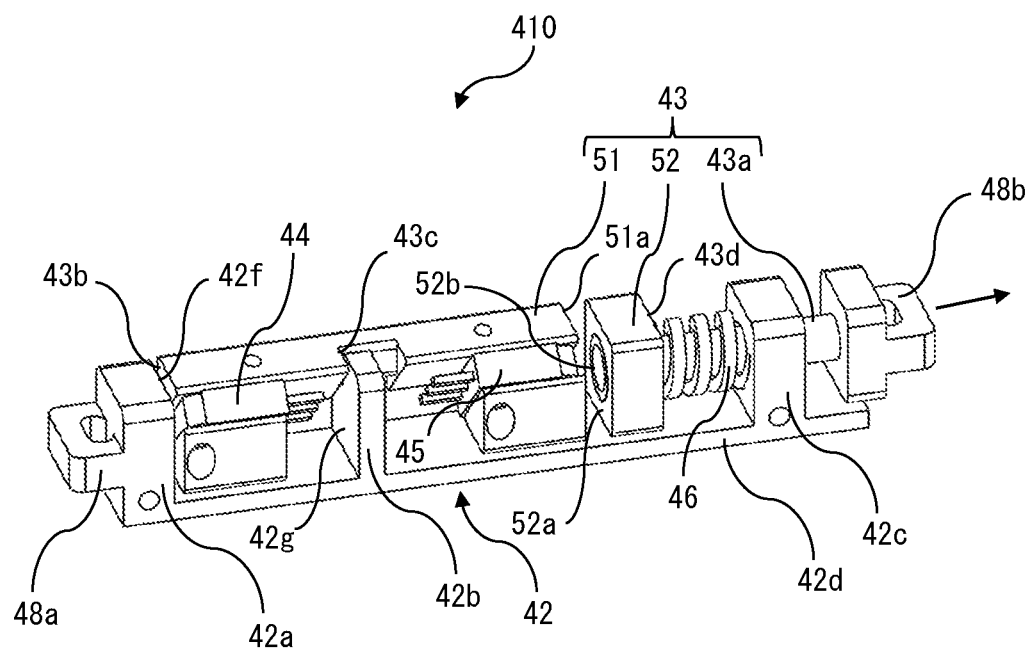
FIG. 13 is a perspective view showing an overall structure of the pulling detection device according to embodiment 3.

A pulling detection device 410 according to embodiment 3 will be described. FIG. 12 is a schematic view showing an overall structure of the pulling detection device 410, and FIG. 13 is a perspective view showing an overall structure of the pulling detection device 410. As shown in FIG. 13, the pulling detection device 410 includes the base 42, the movable rod 43, the first switch 44 and the second switch 45 which are depressed and operated, the compression spring 46, and the guides 47. The pulling detection device 410 according to embodiment 3 is configured such that the second switch 45 operates by separation between an attraction force generating portion 52 and a movable switch body 51 composing the movable rod 43.

The movable rod 43 includes: the attraction force generating portion 52 having, on one side, the second wall portion opposed surface 43d opposed to the second wall portion 42c, and on another side, an attraction force generating surface 52a; the movable switch body 51 connecting the first wall portion opposed surface 43b opposed to the first wall portion 42a, the projection opposed surface 43c opposed to a side of the projection 42b opposed to the first wall portion 42a, and an attraction surface 51a attracted by the attraction force generating surface 52a; and the pulling rod 43a extending from the second wall portion opposed surface 43d so as to penetrate the second wall portion 42c. The movable rod 43 is movable along the foundation portion 42d in the longitudinal direction of the foundation portion 42d. By contact between the first wall portion 42a and the first wall portion opposed surface 43b, movement of the movable rod 43 toward one side in the longitudinal direction is restricted, and by contact between the projection 42b and the projection opposed surface 43c, movement of the movable rod 43 toward another side in the longitudinal direction is restricted.

The movable switch body 51 is made of a magnetic material, and as shown in FIG. 13, the attraction force generating portion 52 has a magnet 52b at the attraction force generating surface 52a so that the attraction surface 51a of the movable switch body 51 is attracted by the attraction force generating surface 52a. The attraction force of the magnet 52b is set to be, at the maximum, not greater than half the tension in the second stage to be detected by the pulling detection device 41. This is because the tension in the second stage to be detected is detected by the second switch 45 being opened when the attraction surface 51a and the attraction force generating surface 52a are separated from each other. In addition, the attraction force of the magnet 52*b* is set in such a range that does not pose a problem for the function of attracting and moving the movable switch body 51.

The movable switch body 51 is provided with the first switch 44 and the second switch 45. The first switch operates by contact/separation between the first wall portion 42*a* and the first wall portion opposed surface 43*b*. The second switch operates by the attraction surface 51*a* and the attraction force generating surface 52*a* being separated from each other due to contact between the projection 42*b* and the projection opposed surface 43*c*. When the first switch 44 or the second switch 45 is operated by being opened from a depressed state, the operation is transmitted to the control unit (not shown).

When the pulling portion 48*b* of the pulling rod 43*a* is pulled and displaced by a predetermined distance in the movable direction (arrow direction in FIG. 12) of the movable rod 43, movement of the movable switch body 51 is constrained by the projection 42*b*, and further, the attraction surface 51*a* and the attraction force generating surface 52*a* are separated from each other, so that the second switch 45 is opened. The above distance is set to a value obtained by subtracting the preload of the compression spring 46 and the attraction force of the magnet 52*b* from the magnitude of the tension in the second stage to be detected and then dividing the subtraction result by the spring constant of the compression spring 46.

Next, pulling detection operation of the pulling detection device will be described. FIG. 14A to FIG. 14E are schematic views showing operations of the pulling detection device according to embodiment 3. In a condition in which no tension acts (FIG. 14A), the first wall portion opposed surface 43*b* of the movable rod 43 is pressed to the inner side surface 42*f* of the first wall portion 42*a* by the preload of the compression spring 46. Meanwhile, the one side 42*g* of the projection 42*b* and the projection opposed surface 43*c* of the movable rod 43 are separated from each other and the attraction surface 51*a* and the attraction force generating surface 52*a* are in contact with each other. Thus, the first switch 44 and the second switch 45 are both depressed.

In a condition in which smaller tension (small arrow) than the preload imparted to the compression spring 46 acts (FIG. 14B), the preload of the compression spring 46 is greater than the magnitude of the tension, and therefore, as in the condition in which no tension acts (FIG. 14A), the first switch 44 and the second switch 45 are both depressed.

Figure 14A:
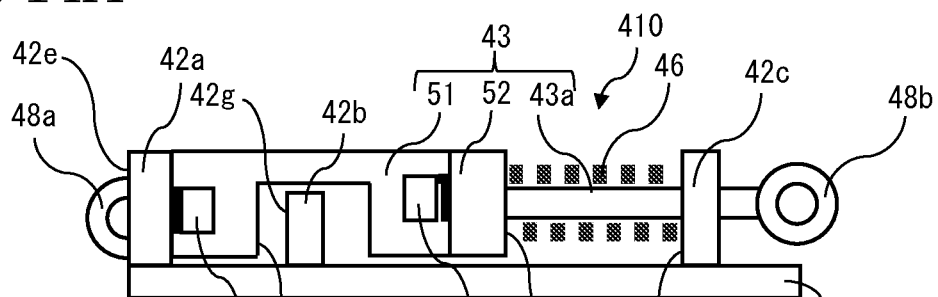
FIG. 14A is a schematic view showing operation of the pulling detection device according to embodiment 3.
Figure 14B:
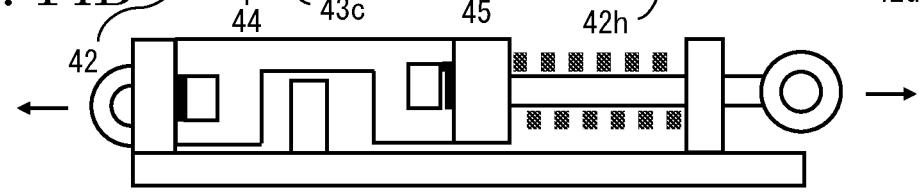
FIG. 14B is a schematic view showing operation of the pulling detection device according to embodiment 3.
Figure 14C:
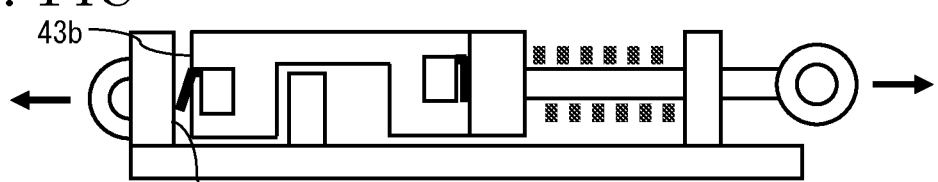
FIG. 14C is a schematic view showing operation of the pulling detection device according to embodiment 3.

In a condition in which tension (middle arrow) greater than the tension in the first stage to be detected and smaller than the tension in the second stage to be detected, acts (FIG. 14C), a force greater than the preload of the compression spring 46 acts, so that the compression spring 46 is compressed and the movable switch body 51 and the attraction force generating portion 52 are integrally displaced rightward in FIG. 14C. Along with the displacement, the first switch 44 is opened, so that the tension in the first stage to be detected is detected. FIG. 14C shows a state after the first switch 44 is opened, and it is found that greater tension than the tension in the first stage to be detected is acting. It is noted that the second switch 45 has not been opened yet.

In a condition in which further great tension (large arrow) acts (FIG. 14D), the compression spring 46 is greatly compressed. As a result of displacement of the movable switch body 51 and the attraction force generating portion 52 by this compression, the one side 42*g* of the projection 42*b* and the projection opposed surface 43*c* of the movable switch body 51 come into contact with each other, so that movement of the movable switch body 51 is constrained, the attraction surface 51*a* and the attraction force generating surface 52*a* are separated from each other, and the second switch 45 is opened. At this time, the tension in the second stage to be detected is detected.

Figure 14D:
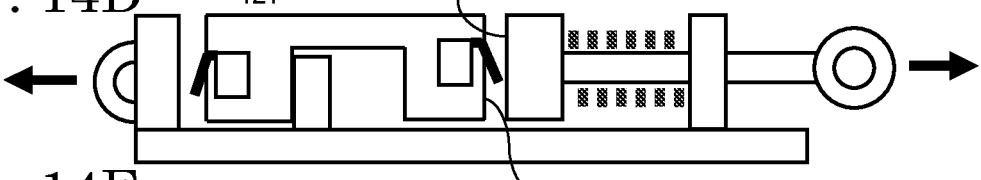
FIG. 14D is a schematic view showing operation of the pulling detection device according to embodiment 3.
Figure 14E:
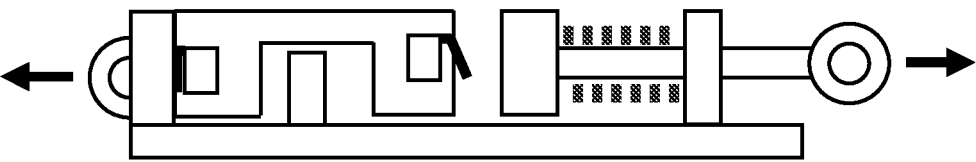
FIG. 14E is a schematic view showing operation of the pulling detection device according to embodiment 3.

After shifting to the state shown in FIG. 14D, the movable switch body 51 is not constrained because the attraction surface 51*a* and the attraction force generating surface 52*a* are separated from each other. Therefore, for example, in the case where the gravity acts leftward in the drawing, a state in which the first switch 44 is depressed can occur as shown in FIG. 14E. However, the state shown in FIG. 14E can occur only after the second switch 45 is opened, and therefore whether great tension is acting can be determined. In order to avoid the state shown in FIG. 14E, for example, a tension spring, a magnet, or the like having a weak force may be attached so that the projection opposed surface 43*c* of the movable switch body 51 is attracted to the projection 42*b*, thereby generating a force in the direction in which the first switch 44 is opened.

FIG. 15 shows detection patterns of the pulling detection device according to embodiment 3. In FIG. 15, ○ indicates a depressed state of the switch, and x indicates an opened state of the switch. As shown in FIG. 15, the pulling detection device 41 can detect three patterns A, B, C. The pattern A is a state in which the first switch 44 and the second switch 45 are both depressed, the pattern B is a state in which only the second switch 45 is depressed, and the pattern C is a state in which the second switch 45 is opened. The magnitudes of the tension in the three patterns respectively correspond to a small level, a middle level, and a great level. For example, in the case where the pulling detection device 41 is connected to a moving body, the three patterns are respectively determined as a normal state, a warning state, and a dangerous state, and control for movement of the moving body 11 can be changed in accordance with the above determination.

Figure 16:
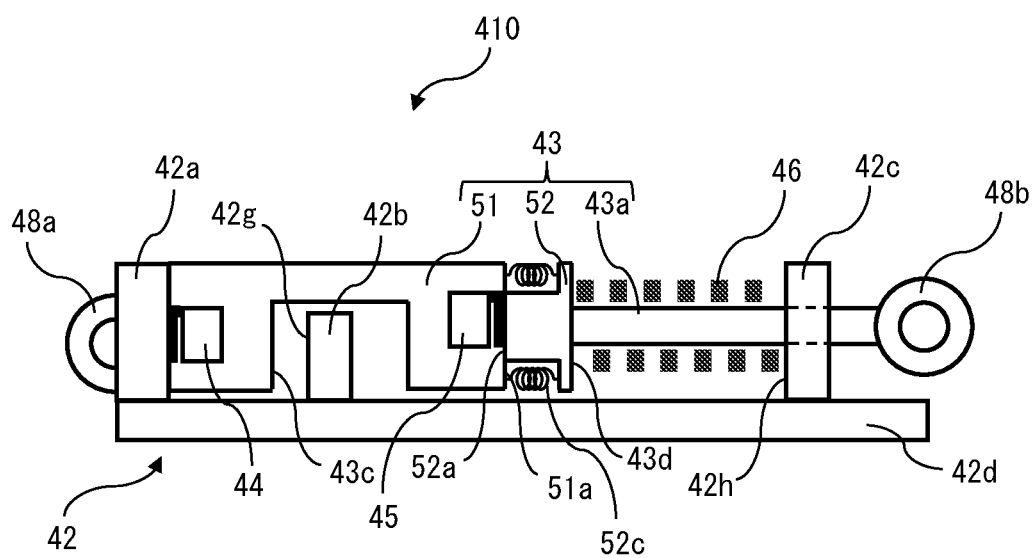
FIG. 16 is a schematic view showing an overall structure of another pulling detection device according to embodiment 3.

In the above description, the attraction surface 51*a* of the movable switch body 51 is attracted by the magnet 52*b*. However, without limitation thereto, for example, as shown in FIG. 16, the attraction surface 51*a* may be attracted by tensile springs 52*c*. The tensile springs 52*c* are connected to the movable switch body 51 and the attraction force generating portion 52. Since the tension in the second stage to be detected is detected by the second switch 45 being opened when the attraction surface 51*a* and the attraction force generating surface 52*a* are separated from each other, it is desirable that the spring constants of the tensile springs 52*c* are small, and thus the tensile springs 52*c* are selected to have smaller spring constants than at least the compression spring 46. In this configuration, connection between the pulling rod 43*a* and the movable switch body 51 within the range of the tension in the second stage to be detected, and prevention of the state shown in FIG. 14E, can be both achieved by one structure. In the above description, the movable switch body 51 having the attraction surface 51*a* is made of a magnetic material and the magnet 52*b* is provided at the attraction force generating surface 52*a*. However, without limitation thereto, a magnet may be provided at the attraction surface 51*a* of the movable switch body 51 and the attraction force generating portion 52 may be made of a magnetic material.

As described above, in the pulling detection device according to embodiment 3, the movable rod 43 includes the pulling rod 43*a*, the movable switch body 51, and the attraction force generating portion 52, and the second switch 45 is operated by separation between the movable switch body 51 and the attraction force generating portion 52.

Therefore, when excessive tension acts on the pulling detection device 41, the tension acting on the pulling detection device 41 is received by the compression spring 46, whereby application of an excessive load to the second switch 45 can be avoided and thus high reliability can be maintained.

Embodiment 4

Figure 17:
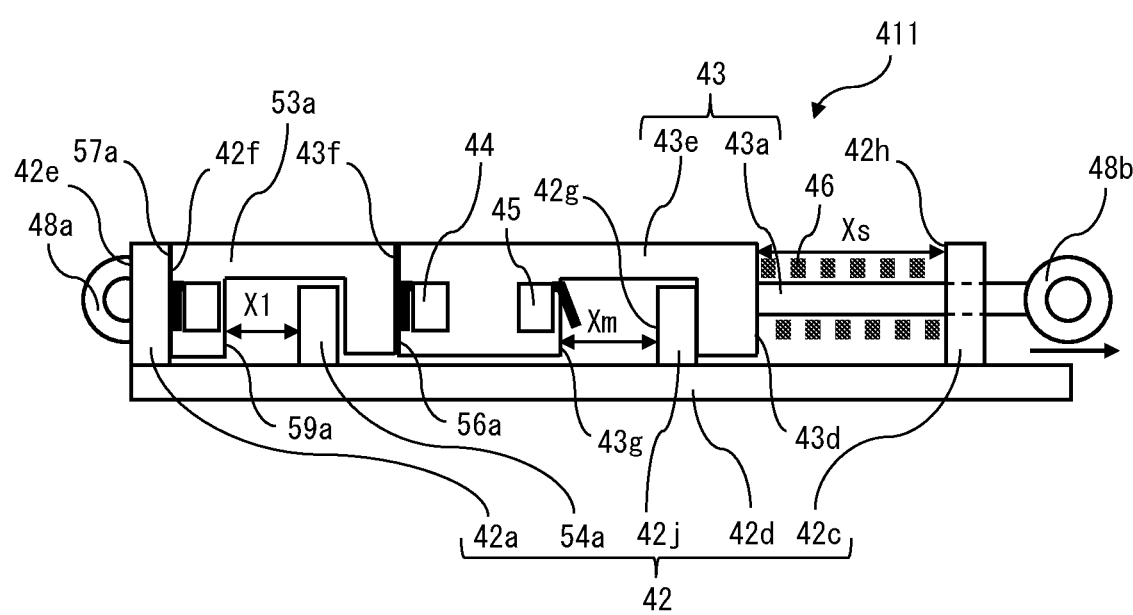
FIG. 17 is a schematic view showing an overall structure of a pulling detection device according to embodiment 4.

A pulling detection device 411 according to embodiment 4 will be described. FIG. 17 is a schematic view showing an overall structure of the pulling detection device 411. In embodiment 4, a pulling detection extension unit is provided to the pulling detection device 411, to detect, in increased stages, tension acting on a moving body through the pulling detection device 411 from a control cable connected to the pulling detection device 411.

First, the case of providing one pulling detection extension unit 53 will be described. As shown in FIG. 17, the pulling detection device 411 includes the base 42, the movable rod 43, the first switch 44 and the second switch 45 which are depressed and operated, the compression spring 46, and the first pulling detection extension unit 53a. The pulling detection extension unit 53 is supported so as to be movable only in one direction by a guide (not shown) provided to the base 42 or an outer cover (not shown), and movements thereof in the other directions are constrained.

The base 42 is formed such that the first wall portion 42a with the pulling portion 48a provided at the outer side surface 42e, a first projection 54a opposed to the first wall portion 42a, a last projection 42j opposed to the first projection 54a, and the second wall portion 42c opposed to the last projection 42j are provided in this order on the plate-shaped foundation portion 42d extending in the longitudinal direction.

Figure 18:
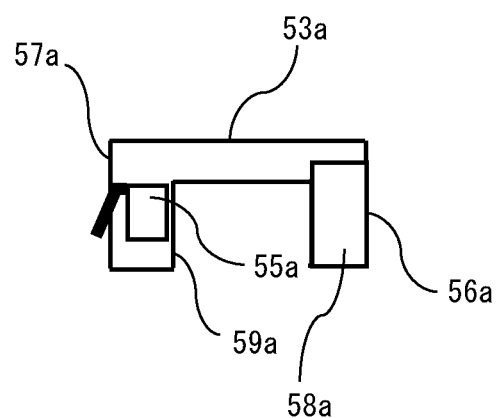
FIG. 18 is a schematic view showing an overall structure of a pulling detection extension unit according to embodiment 4.

The first pulling detection extension unit 53a has, on one of the sides across the first projection 54a, a first wall portion opposed surface 57a opposed to the first wall portion 42a, and on the other side, an attraction structure portion 56a. FIG. 18 is a schematic view showing an overall structure of the first pulling detection extension unit 53a. The first pulling detection extension unit 53a has, a switch i 55a (i=1) on the first wall portion opposed surface 57a side, and a magnet 58a as an attraction force generating surface on the attraction structure portion 56a side. The switch i 55a is opposed to the inner side surface 42f of the first wall portion 42a, and the magnet 58a is opposed to the first switch 44 provided to the movable rod 43. The switch i 55a operates by contact/separation between the first wall portion 42a and the first wall portion opposed surface 57a.

The movable rod 43 has the same structure as the movable rod 43 in FIG. 1, and as shown in FIG. 17, includes: the switch operation body 43e having a last attraction structure surface 43f opposed to the attraction structure portion 56a, a last projection opposed surface 43g opposed to a surface on the first wall portion 42a side of the last projection 42j, and the second wall portion opposed surface 43d opposed to the second wall portion 42c; and the pulling rod 43a extending from the second wall portion opposed surface 43d so as to penetrate the second wall portion 42c. The movable rod 43 is movable along the foundation portion 42d in the longitudinal direction of the foundation portion 42d. By contact between the first wall portion 42a and the first wall portion opposed surface 57a, movement of the movable rod 43 toward one side in the longitudinal direction is restricted, and by contact between the last projection 42j and the last projection opposed surface 43g, movement of the movable rod 43 toward the other side in the longitudinal direction is restricted. The switch operation body 43e having the last attraction structure surface 43f is made of a magnetic material as an attraction surface attracted by the magnet 58a which is the attraction force generating surface.

The compression spring 46 which is an elastic body is provided between the second wall portion opposed surface 43d and the second wall portion 42c so that the compression spring 46 extends/contracts in the longitudinal direction of the foundation portion 42d in which the movable rod 43 and the first pulling detection extension unit 53a move, and presses the second wall portion opposed surface 43d. The magnitude of the preload of the compression spring 46 by the compression thereof is set to a value obtained by adding a return force of the switch i 55a to return to an opened state, to the magnitude of tension in the first stage to be detected.

The first switch 44 and the second switch 45 are provided to the switch operation body 43e. The first switch 44 operates by contact/separation between the attraction structure portion 56a and the last attraction structure surface 43f, and the second switch 45 operates by contact/separation between the last projection 42j and the last projection opposed surface 43g. The configuration may be made such that the switch i 55a and the second switch 45 are provided to the base 42, and the first switch 44 is provided to the first pulling detection extension unit 53a.

A distance X1 from an opposed surface 59a opposed to the first projection 54a on the side having the first wall portion opposed surface 57a in the first pulling detection extension unit 53a, to the first projection 54a, a distance Xm from the last projection opposed surface 43g to the last projection 42j, and a distance Xs from the second wall portion opposed surface 43d to the second wall portion 42c, are set to satisfy X1<Xm<Xs when the first wall portion 42a is pressed by the first wall portion opposed surface 57a. With this setting, the plurality of switches provided to the pulling detection device 411 operate in the order of the switch i 55a, the first switch 44, then the second switch 45 in accordance with the magnitude of the tension.

Figure 19:
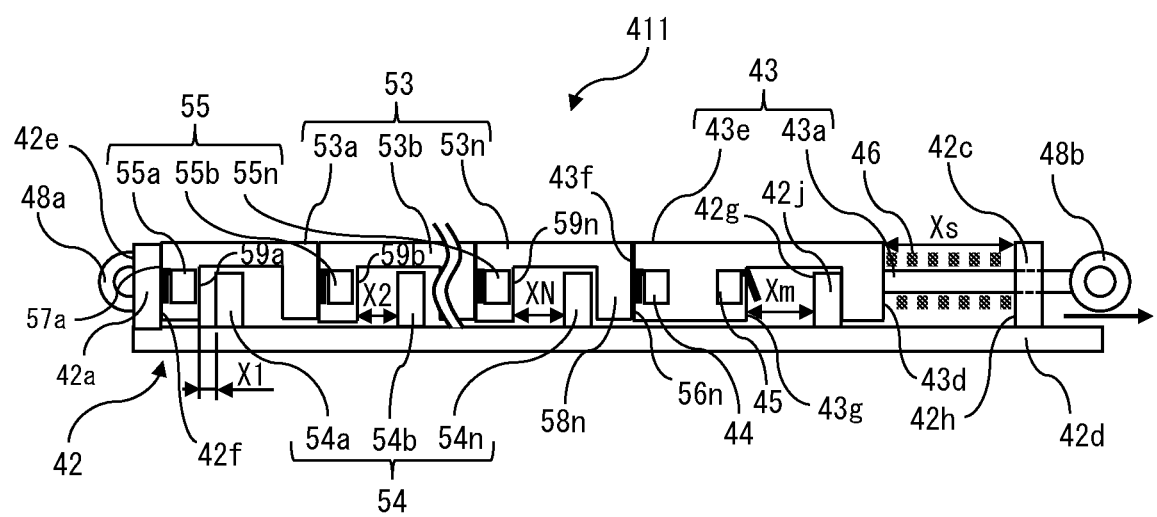
FIG. 19 is a schematic view of an overall structure of the pulling detection device according to embodiment 4.

Next, the case of providing a plurality of pulling detection extension units 53 to the pulling detection device 411 will be described. FIG. 19 is a schematic view showing an overall structure of the pulling detection device 411. The pulling detection device 411 includes the base 42, the movable rod 43, the first switch 44 and the second switch 45 which are depressed and operated, the compression spring 46, and the plurality of pulling detection extension units 53.

The base 42 is formed such that the first wall portion 42a with the pulling portion 48a provided at the outer side surface 42e, N projections (N is an integer not less than 1) from the first projection to an Nth projection 54n, the last projection 42j opposed to the Nth projection 54n, and the second wall portion 42c opposed to the last projection 42j are provided in this order on the plate-shaped foundation portion 42d extending in the longitudinal direction.

The first pulling detection extension unit 53a has, on one of the sides across the first projection 54a, the first wall portion opposed surface 57a opposed to the first wall portion 42a, and on the other side, the attraction structure portion 56a. The (N−1) pulling detection extension units from the second pulling detection extension unit 53b to the Nth pulling detection extension unit 53n each have an attraction structure surface on the first wall portion side and an attraction structure portion on the other side across each of the second projection 54b to the Nth projection 54n. The structure of each of the second pulling detection extension unit 53b to the Nth pulling detection extension unit 53n is the same as the structure of the first pulling detection extension unit 53a shown in FIG. 18. The second pulling detection extension unit 53b to the Nth pulling detection extension unit 53n having attraction structure surfaces are each made of a magnetic material as an attraction surface attracted by the magnet 58a which is the attraction force generating surface. The switch i 55 (i is an integer from 2 to N) provided to each of the second pulling detection extension unit 53b to the Nth pulling detection extension unit 53n operates by contact/separation between the (i−1)th pulling detection extension unit and the ith pulling detection extension unit.

The movable rod 43 has the same structure as the movable rod 43 in FIG. 1, and as shown in FIG. 19, includes: the switch operation body 43e having the last attraction structure surface 43f opposed to the attraction structure portion 56n, the last projection opposed surface 43g opposed to the surface on the first wall portion 42a side of the last projection 42j, and the second wall portion opposed surface 43d opposed to the second wall portion 42c; and the pulling rod 43a extending from the second wall portion opposed surface 43d so as to penetrate the second wall portion 42c. The movable rod 43 is movable along the foundation portion 42d in the longitudinal direction of the foundation portion 42d. By contact between the first wall portion 42a and the first wall portion opposed surface 57a, movement of the movable rod 43 toward one side in the longitudinal direction is restricted, and by contact between the last projection 42j and the last projection opposed surface 43g, movement of the movable rod 43 toward the other side in the longitudinal direction is restricted. The switch operation body 43e having the last attraction structure surface 43f is made of a magnetic material as an attraction surface attracted by the magnet 58n which is the attraction force generating surface.

The compression spring 46 which is an elastic body is provided between the second wall portion opposed surface 43d and the second wall portion 42c so that the compression spring 46 extends/contracts in the longitudinal direction of the foundation portion 42d in which the movable rod 43 and the first pulling detection extension unit 53a move, and presses the second wall portion opposed surface 43d. The magnitude of the preload of the compression spring 46 by the compression thereof is set to a value obtained by adding a return force of the switch i 55a to return to an opened state, to the magnitude of the tension in the first stage to be detected.

The first switch 44 and the second switch 45 are provided to the switch operation body 43e. The first switch 44 operates by contact/separation between the attraction structure portion 56n and the last attraction structure surface 43f, and the second switch 45 operates by contact/separation between the last projection 42j and the last projection opposed surface 43g. The configuration may be made such that the switch i 55a (i=1) and the second switch 45 are provided to the base 42, the first switch 44 is provided to the Nth pulling detection extension unit 53n, and the switch i 55 (i is an integer from 2 to N) is provided to the (i−1)th pulling detection extension unit.

A distance $X_{i-1}$ (i is an integer from 2 to N) from an opposed surface against the (i−1)th projection on the first wall portion 42a side in the (i−1)th pulling detection extension unit, to the (i−1)th projection, a distance $X_i$ (i is an integer from 2 to N) from an opposed surface against the ith projection on the first wall portion 42a side in the ith pulling detection extension unit, to the ith projection, the distance $X_m$ from the last projection opposed surface 43g to the last projection 42j, and the distance $X_s$ from the second wall portion opposed surface 43d to the second wall portion 42c, are set to satisfy $X_{i-1} < X_i$ and $X_N < X_m < X_s$ when the first wall portion 42a is pressed by the first wall portion opposed surface 57a. In FIG. 19, $X_1 < X_2 < X_N < X_m < X_s$ is satisfied. When the pulling rod 43a is pulled and displaced by the distance X1 in the movable direction (arrow direction in FIG. 19) of the movable rod 43 in which the compression spring 46 contracts from the initial state in which the preload is acting, the opposed surface 59a and the first projection 54a come into contact with each other, so that displacement of the first pulling detection extension unit 53a is constrained, the first pulling detection extension unit 53a and the second pulling detection extension unit 53b are separated from each other, and the switch 55b is opened. The distance X1 is set to a value obtained by subtracting the preload of the compression spring 46 from the magnitude of the tension in the second stage to be detected and then dividing the subtraction result by the spring constant of the compression spring 46. As the pulling rod 43a is further displaced, the plurality of switches provided to the pulling detection device 411 sequentially operate from the left in FIG. 19, in accordance with the magnitude of the tension. Since $X_m < X_s$ is satisfied, when the second switch 45 is depressed, the compression spring reaches its compression limit and displacement of the pulling rod 43a is stopped.

Next, pulling detection operation of the pulling detection device 411 will be described. FIG. 20A to FIG. 20D are schematic views showing operations of the pulling detection device according to embodiment 4. In a condition in which no tension acts (FIG. 20A), the first pulling detection extension unit 53a is pressed to the inner side surface 42f of the first wall portion 42a by the preload of the compression spring 46, the pulling detection extension units 53 are respectively connected by the magnets, and the Nth pulling detection extension unit 53n and the movable rod 43 are also connected with each other. Meanwhile, the one side 42g of the last projection 42j and the last projection opposed surface 43g of the movable rod 43 are separated from each other. Thus, the switches i 55 (i is an integer from 1 to N) and the first switch 44 are depressed and the second switch 45 is opened.

In a condition in which smaller tension (small arrow) than the preload imparted to the compression spring 46 acts (FIG. 20B), the preload of the compression spring 46 is greater than the tension, and therefore, as in the condition in which no tension acts (FIG. 20A), the switches i 55 (i is an integer from 1 to N) and the first switch 44 are depressed and the second switch 45 is opened.

Figure 20A:
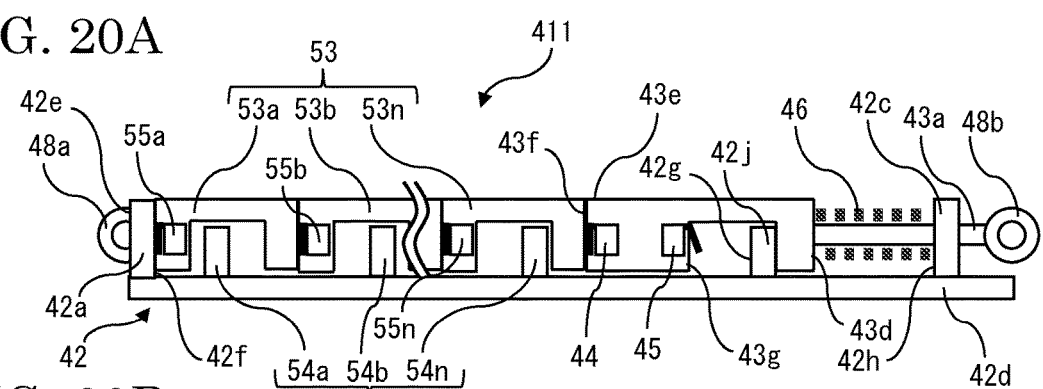
FIG. 20A is a schematic view showing operation of the pulling detection device according to embodiment 4.
Figure 20B:
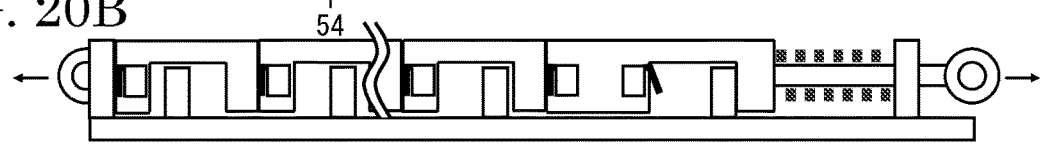
FIG. 20B is a schematic view showing operation of the pulling detection device according to embodiment 4.
Figure 20C:
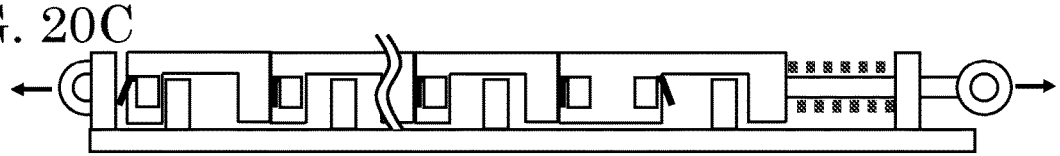
FIG. 20C is a schematic view showing operation of the pulling detection device according to embodiment 4.
Figure 20D:
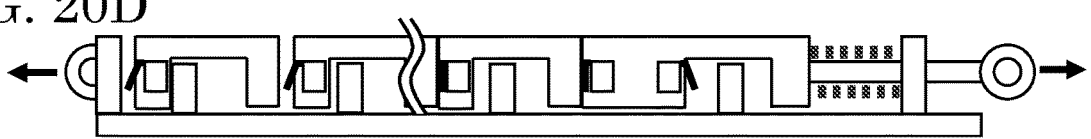
FIG. 20D is a schematic view showing operation of the pulling detection device according to embodiment 4.

In a condition in which tension (middle arrow) greater than the magnitude of the tension in the first stage to be detected and smaller than the magnitude of the tension in the second stage to be detected, acts (FIG. 20C), a force greater than the preload of the compression spring 46 acts, so that the compression spring 46 is compressed and the movable rod 43 and the pulling detection extension units 53 are displaced by a distance smaller than X1 rightward in FIG. 20C. Along with the displacement, the first wall portion 42a and the first pulling detection extension unit 53a are separated from each other and the switch i 55a (i=1) is opened, so that the tension in the first stage to be detected is detected. FIG. 20C shows a state after the opening, and it is found that greater tension than the tension in the first stage to be detected is acting.

In a condition in which tension (large arrow) greater than the magnitude of the tension in the second stage to be detected and smaller than the magnitude of the tension in the third stage to be detected, acts (FIG. 20D), the compression spring 46 is further compressed. The pulling detection extension units 53 other than the first pulling detection extension unit 53a, and the movable rod 43, are displaced by a distance greater than X1 and smaller than X2 rightward in FIG. 20D. As a result of the displacement, the first pulling detection extension unit 53a and the second pulling detection extension unit 53b are separated from each other, the switch i 55b (i=2) is opened, and the tension in the second stage to be detected is detected. At this time, rightward displacement of the first pulling detection extension unit 53a is constrained by contact between the first pulling detection extension unit 53a and the first projection 54a. After shifting to the state shown in FIG. 20D, leftward displacement of the first pulling detection extension unit 53a is not constrained, and therefore, for example, in the case where the gravity acts leftward in the drawing, a state in which the switch 55a and the first wall portion 42a come into contact with each other and the switch i 55a (i=1) is depressed, can occur. However, the state in which the switch 55a is pressed again can occur only after the switch i 55b (i=2) is opened, and therefore whether tension greater than the magnitude of the tension in the second stage to be detected is acting can be determined.

Thereafter, in accordance with preset stages of the magnitude of the tension to be detected, the plurality of switches i 55 (i is an integer from 3 to N), the first switch 44, and the second switch 45 sequentially operate, whereby the magnitude of the tension can be detected in multiple stages.

FIG. 21 shows detection patterns of the pulling detection device according to embodiment 4. In FIG. 21, ○ indicates a depressed state of the switch, and x indicates an opened state of the switch. The first pulling detection extension unit 53a shown in FIG. 18 is provided with one switch 55a, and therefore, per addition of one such pulling detection extension unit, the number of detection stages can be increased by one through detection of the corresponding switch operation. In accordance with these detection stages, it is possible to finely change control of movement of the moving body provided with the pulling detection device 41, in multiple stages.

Figure 22:
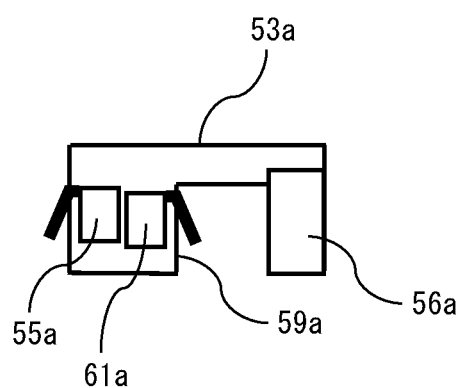
FIG. 22 is a schematic view showing an overall structure of another pulling detection extension unit according to embodiment 4.

In the first pulling detection extension unit 53a shown in FIG. 18, one switch 55a is provided. However, without limitation thereto, a plurality of switches may be provided. As shown in FIG. 22, another first pulling detection extension unit 53a is provided with one more switch 61a at the opposed surface 59a on one side where the switch 55a is provided. In this structure, the switch 61a is depressed when the opposed surface 59a and the first projection 54a opposed to the opposed surface 59a come into contact with each other. Depression of the switch 61a is performed with smaller tension than the magnitude of tension with which the switch 55b provided to the second pulling detection extension unit 53b located on the right adjacent side operates. Thus, it is possible to increase the stages of the magnitude of the tension to be detected, without increasing the pulling detection extension units. In addition, by using the other pulling detection extension unit, it is possible to halve the number of pulling detection extension units if the number of stages of the magnitude of the tension to be detected is the same.

In the above description, connections between the pulling detection extension units 53 are made using magnets. However, without limitation thereto, for example, they may be connected using tensile springs having small rigidities, instead of magnets. In this case, the rigidity of the compression spring 46 is set to be the greatest, and the tensile springs are provided such that the rigidities of the tensile springs used for the respective connections become smaller sequentially from the connection between the Nth pulling detection extension unit 53n and the movable rod 43 to the connection between the first pulling detection extension unit 53a and the second pulling detection extension unit 53b. In the above description, the magnet as the attraction force generating surface is provided to the attraction structure portion, and the magnetic material as the attraction surface is provided to the attraction structure surface or the last attraction structure surface. However, without limitation thereto, the attraction structure portion may be formed as the attraction surface, and the attraction structure surface or the last attraction structure surface may be formed as the attraction force generating surface.

As described above, in the pulling detection device 411, the pulling detection extension unit 53 having the magnet and the switch is provided, whereby it is possible to detect tension acting on the pulling detection device 411 in increased stages using combinations of depressed and opened operation states of the switch i 55 (i is an integer from 1 to N), the first switch 44, and the second switch 45. Thus, it is possible to detect the magnitude of tension acting on the control cable 31 in increased stages and highly reliably, with a small-sized and simple structure. In addition, by using the pulling detection device 411 in the moving body system 1, since the pulling detection device 411 can detect the magnitude of tension acting on the control cable 31 in increased stages and highly reliably, it is possible to finely execute an action of avoiding hampering of movement of the moving body 11 or an operation of stopping movement of the moving body 11 in accordance with the stage of the magnitude of the tension, whereby damage or breakage of the control cable 31 can be inhibited highly reliably.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 moving body system
11 moving body
12 connection member
13 traveling device
21 control unit
31 control cable
41 pulling detection device
41c connection portion
42 base
42a first wall portion
42b projection
42c second wall portion
42d foundation portion
42j last projection
43 movable rod 43a pulling rod
43b first wall portion opposed surface
43c projection opposed surface
43d second wall portion opposed surface
43e switch operation body
43f last attraction structure surface
43g last projection opposed surface
44 first switch
45 second switch
46 compression spring
47 guide
48a pulling portion
48b pulling portion
50 cable guide
51 movable switch body
51a attraction surface
52 attraction force generating portion
52a attraction force generating surface
52b magnet
52c tensile spring
53a first pulling detection extension unit
54a first projection
55 switch i
58a magnet
60 wall surface
70 wire

The invention claimed is:

1. A pulling detection device comprising:
a base having a plate-shaped foundation portion extending in a longitudinal direction;
a first wall portion, a projection opposed to the first wall portion, and a second wall portion opposed to the projection arranged on the foundation portion in this order in the longitudinal direction;
a movable rod including a switch operation body and a pulling rod, the switch operation body having a first wall portion opposed surface opposed to the first wall portion, a projection opposed surface opposed to a side of the projection opposed to the first wall portion, and a second wall portion opposed surface opposed to the second wall portion, the pulling rod extending from the second wall portion opposed surface so as to penetrate the second wall portion, the movable rod being movable along the foundation portion in the longitudinal direction of the foundation portion, while movement of the movable rod toward one side of the foundation portion in the longitudinal direction is restricted by contact between the first wall portion and the first wall portion opposed surface and movement of the movable rod toward another side of the foundation portion in the longitudinal direction is restricted by contact between the projection and the projection opposed surface;
an elastic body provided between the second wall portion opposed surface and the second wall portion so as to press the second wall portion opposed surface, the elastic body being extendable/contractible in the longitudinal direction of the foundation portion;
a first switch which operates by contact/separation between the first wall portion and the first wall portion opposed surface; and
a second switch which operates by contact/separation between the projection and the projection opposed surface.

2. The pulling detection device according to claim 1, wherein
the switch operation body includes the first switch and the second switch.

3. The pulling detection device according to claim 1, wherein
the base includes a guide for supporting the movable rod in the longitudinal direction of the foundation portion.

4. The pulling detection device according to claim 1, wherein
the first switch, the second switch, the first wall portion, the projection, and the pulling rod are arranged in a straight line.

5. The pulling detection device according to claim 1, wherein
the first switch and the second switch are depression-type switches which operate in a direction of movement of the movable rod.

6. The pulling detection device according to claim 1, wherein
a side surface of the first wall portion opposite to a side surface of the first wall portion opposed to the first wall portion opposed surface having a pulling portion, and an end of the pulling rod protruding from the second wall portion having a pulling portion.

7. A moving body system comprising:
the pulling detection device according to claim 1;
a moving body connected to one side of the pulling detection device;
a control cable connected at one side to the moving body via another side of the pulling detection device; and
a controller which is connected to another side of the control cable and is configured to output a control signal for instructing an operation of the moving body to the moving body in accordance with operations of the first switch and the second switch to advance in a first direction.

8. The moving body system according to claim 7, wherein
the controller is configured to output a control signal to instruct reduction of a movement speed of the moving body in accordance with the operation of the first switch.

9. The moving body system according to claim 7, wherein
the controller is configured to output a control signal to instruct movement of the moving body toward a reverse direction opposite the first direction in accordance with the operation of the first switch.

10. The moving body system according to claim 7, wherein
the controller is configured to output a control signal to stop movement of the moving body in accordance with the operation of the second switch.

11. A pulling detection device comprising:
a base having a plate-shaped foundation portion extending in a longitudinal direction;
a first wall portion, a projection opposed to the first wall portion, and a second wall portion opposed to the projection arranged on the foundation portion in this order in the longitudinal direction;
a movable rod including an attraction force generating portion, a movable switch body, and a pulling rod, the attraction force generating portion having, on one side, a second wall portion opposed surface opposed to the second wall portion, and on another side, an attraction force generating surface, the movable switch body having a first wall portion opposed surface opposed to the first wall portion, a projection opposed surface opposed to a side of the projection opposed to the first wall portion, and an attraction surface attracted by the attraction force generating surface, the pulling rod extending from the second wall portion opposed surface so as to penetrate the second wall portion, the movable rod being movable along the foundation portion in the longitudinal direction of the foundation portion, while movement of the movable rod toward one side of the foundation portion in the longitudinal direction is restricted by contact between the first wall portion and the first wall portion opposed surface and movement of the movable rod toward another side of the foundation portion in the longitudinal direction is restricted by contact between the projection and the projection opposed surface;

an elastic body provided between the second wall portion opposed surface and the second wall portion so as to press the second wall portion opposed surface, the elastic body being extendable/contractible in the longitudinal direction of the foundation portion;

a first switch which operates by contact/separation between the first wall portion and the first wall portion opposed surface; and a second switch which operates by the attraction surface and the attraction force generating surface being separated from each other due to contact between the projection and the projection opposed surface.

12. The pulling detection device according to claim 11, wherein
the movable switch body includes the first switch and the second switch.

13. The pulling detection device according to claim 11, wherein
the attraction force generating surface includes a magnet.

14. The pulling detection device according to claim 11, wherein
the attraction force generating surface includes an elastic body.

15. A pulling detection device, comprising:
a base having a plate-shaped foundation portion extending in a longitudinal direction;
a first wall portion, N projections, a last projection, and a second wall portion arranged on the foundation portion in this order in the longitudinal direction; and
a first pulling detection extension unit having, on one of sides across the first projection, a first wall portion opposed surface opposed to the first wall portion, and on another side, an attraction structure portion,
in a case where N is 1, the pulling detection device comprising:
a movable rod including a switch operation body and a pulling rod, the switch operation body having a last attraction structure surface opposed to the attraction structure portion, a projection opposed surface opposed to a surface on the first wall portion side of the projection, and a second wall portion opposed surface opposed to the second wall portion, the pulling rod extending from the second wall portion opposed surface so as to penetrate the second wall portion, the movable rod being movable along the foundation portion in the longitudinal direction of the foundation portion, while movement of the movable rod toward one side of the foundation portion in the longitudinal direction is restricted by contact between the first wall portion and the first wall portion opposed surface and movement of the movable rod toward another side of the foundation portion in the longitudinal direction is restricted by contact between the projection and the projection opposed surface;
an elastic body provided between the second wall portion opposed surface and the second wall portion so as to press the second wall portion opposed surface, the elastic body being extendable/contractible in the longitudinal direction of the foundation portion;

a switch which operates by contact/separation between the first wall portion and the first wall portion opposed surface;

a first switch which operates by contact/separation between the attraction structure portion and the last attraction structure surface; and a second switch which operates by contact/separation between the projection and the projection opposed surface, wherein one of the attraction structure portion and the last attraction structure surface is formed to be an attraction force generating surface, and another one is formed to be an attraction surface attracted by the attraction force generating surface, and a distance X1 from an opposed surface opposed to the projection on a side having the first wall portion opposed surface in the first pulling detection extension unit, to the projection, a distance Xm from the projection opposed surface to the projection, and a distance Xs from the second wall portion opposed surface to the second wall portion, satisfies X1<Xm<Xs, when the first wall portion is pressed by the first wall portion opposed surface, in a case where N is not less than 2, the pulling detection device comprising:

the first pulling detection extension unit, and (N−1) pulling detection extension units from a second pulling detection extension unit to an ith pulling detection extension unit each having an attraction structure surface on the first wall portion side across the ith projection, and the attraction structure portion on another side, i being an integer from 2 to N;

a movable rod including a switch operation body, and a pulling rod, the switch operation body having a last attraction structure surface opposed to the Nth pulling detection extension unit, a last projection opposed surface opposed to a side of the last projection opposed to the first wall portion, and a second wall portion opposed surface opposed to the second wall portion, the pulling rod extending from the second wall portion opposed surface so as to penetrate the second wall portion, the movable rod being movable along the foundation portion in the longitudinal direction of the foundation portion, while movement of the movable rod toward one side in the longitudinal direction is restricted by contact between the first wall portion and the first wall portion opposed surface and movement of the movable rod toward another side in the longitudinal direction is restricted by contact between the last projection and the last projection opposed surface;

an elastic body provided between the second wall portion opposed surface and the second wall portion so as to press the second wall portion opposed surface, the elastic body being extendable/contractible in the longitudinal direction of the foundation portion;

a switch 1 which operates by contact/separation between the first wall portion and the first wall portion opposed surface;

a switch i which operates by contact/separation between the (i−1)th pulling detection extension unit and the ith pulling detection extension unit;

a first switch which operates by contact/separation between the Nth pulling detection extension unit and the last attraction structure surface; and a second switch which operates by contact/separation between the last projection and the last projection opposed surface, wherein one of the attraction structure portion, and the attraction structure surface or the last attraction structure surface, is an attraction force generating surface, and another one is an attraction surface attracted by the attraction force generating surface, and a distance $X_{i-1}$ from an opposed surface against the (i−1)th projection on the first wall portion side in the (i−1)th pulling detection extension unit, to the (i−1)th projection, a distance $X_i$ from an opposed surface against the ith projection on the first wall portion side in the ith pulling detection extension unit, to the ith projection, a distance $Xm_2$ from the last projection opposed surface to the last projection, and a distance $Xs_2$ from the second wall portion opposed surface to the second wall portion, are set to satisfy $X_{i-1} < X_i$ and $X_N < Xm_2 < Xs_2$, when the first wall portion is pressed by the first wall portion opposed surface.

16. The pulling detection device according to claim 15, wherein one of the attraction force generating surface and the attraction surface is formed by a magnetic body, and another one is a magnet.

17. A moving body system comprising:

the pulling detection device according to claim 15;

a moving body connected to one side of the pulling detection device;

a control cable connected at one side to the moving body via another side of the pulling detection device; and a controller which is connected to another side of the control cable and outputs a control signal for instructing an operation of the moving body to the moving body in accordance with operations of the first switch, the second switch, and the switch i, i being an integer from 1 to N.

* * * * *